(12) United States Patent
Li et al.

(10) Patent No.: US 12,537,447 B2
(45) Date of Patent: Jan. 27, 2026

(54) SWITCHED-CAPACITOR TYPE MODULAR DIRECT-CURRENT POWER SUPPLY WITH A HIGH STEP-DOWN RATIO

(71) Applicant: Zhejiang University, Zhejiang (CN)

(72) Inventors: Chushan Li, Zhejiang (CN); Wuhua Li, Zhejiang (CN); Shengdao Ren, Zhejiang (CN); Chengmin Li, Zhejiang (CN); Lin Zhu, Zhejiang (CN); Jing Sheng, Zhejiang (CN); Xiangning He, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 181 days.

(21) Appl. No.: 18/294,742

(22) PCT Filed: Dec. 30, 2021

(86) PCT No.: PCT/CN2021/143186
§ 371 (c)(1),
(2) Date: Feb. 2, 2024

(87) PCT Pub. No.: WO2023/015833
PCT Pub. Date: Feb. 16, 2023

(65) Prior Publication Data
US 2024/0339927 A1 Oct. 10, 2024

(30) Foreign Application Priority Data
Aug. 13, 2021 (CN) .......................... 202110932046.7

(51) Int. Cl.
*H02M 3/07* (2006.01)
*H02M 1/00* (2006.01)
(52) U.S. Cl.
CPC ........... *H02M 3/077* (2021.05); *H02M 1/007* (2021.05)

(58) Field of Classification Search
CPC ............................................... H02M 3/07–077
See application file for complete search history.

(56) References Cited

U.S. PATENT DOCUMENTS

| 11,228,257 B2 * | 1/2022 | Munk-Nielsen ............................. H02M 3/33584 |
| 2019/0052177 A1 * | 2/2019 | Lu .......................... H02M 7/217 |

(Continued)

FOREIGN PATENT DOCUMENTS

| CN | 202444423 U | 9/2012 |
| CN | 103296882 A | 9/2013 |

(Continued)

*Primary Examiner* — Sisay G Tiku
(74) *Attorney, Agent, or Firm* — MUNCY, GEISSLER, OLDS & LOWE, P.C.

(57) ABSTRACT

A switched-capacitor type modular direct-current power supply with a high step-down ratio includes an upper modular cascade circuit string and/or a lower modular cascade circuit string, a load, and an input source. The upper and lower modular cascade circuit strings respectively include i upper submodule circuits and j lower submodule circuits. All the submodule circuits are non-isolated three-port resonant switched-capacitor circuits including input and output capacitors connected in series. The power supply is formed, by modular cascades, into a high-step-down-ratio direct-current power supply having high voltage direct-current input and low voltage direct-current output. Combination modes of modules include cascading of upper module strings, cascading of lower module strings, and mixed cascading of the upper and lower module strings. Flexible expansion can be performed based on voltage and power class requirements, without involving any voltage or current measurement apparatus.

8 Claims, 23 Drawing Sheets

(56) References Cited

U.S. PATENT DOCUMENTS

| | | |
|---|---|---|
| 2019/0115830 A1 | 4/2019 | Giuliano |
| 2022/0337157 A1* | 10/2022 | Li ........................ H02M 1/0077 |
| 2022/0352394 A1* | 11/2022 | Ledenev ................. H02M 7/44 |
| 2025/0279730 A1* | 9/2025 | Liu ................... H02M 3/33573 |

FOREIGN PATENT DOCUMENTS

| | | |
|---|---|---|
| CN | 104362858 A | 2/2015 |
| CN | 1117 40597 A | 10/2020 |
| CN | 113691122 A | 11/2021 |

* cited by examiner

SWITCHED-CAPACITOR TYPE MODULAR DIRECT-CURRENT POWER SUPPLY WITH A HIGH STEP-DOWN RATIO

BACKGROUND OF THE INVENTION

Field of the Invention

The present invention relates to the field of power electronics, and in particular to, a switched-capacitor type modular direct-current power supply with a high step-down ratio.

Description of the Related Art

In power electronic equipment, medium-voltage high-power converting equipment typically refers to devices with voltage levels of 1 kV to 35 kV. In the scenario where auxiliary power is directly obtained from the medium-voltage direct-current bus, how to achieve, in a simple, impact, low-cost manner, high step-down ratio operation and high voltage isolation for an auxiliary power supply in a medium-voltage direct-current system is a difficult problem in the medium-voltage direct-current system.

The existing commercial power semiconductor device has a limited voltage level with a maximum of only 6.5 kV, and thus cannot be directly used in the medium-voltage direct-current system. Therefore, direct connection of the power electronic converter on a medium-voltage direct current side must require the use of semiconductor-device series-connection technologies or modular power-supply cascade technologies, and solutions for the voltage sharing problem of devices or modules connected in series.

When semiconductor devices are directly connected in series, precise gate control over drive signals is required to synchronize operations of switch devices. The paper "Gate-control strategies for snubberless operation of series connected IGBTs" (PESC Record. 27th Annual IEEE Power Electronics Specialists Conference, Baveno, Italy, 1996, pp. 1739-1742 vol. 2) has proposed a synchronization technology using a delay circuit. Specifically, all the drive signals are delayed to synchronize operations of the switch devices. The parameters of the switch devices connected in series, however, are different, and the delay parameters of the modules are also different. These differences and high isolation requirements for drive make the modular design difficult. In summary, the solution of directly connecting semiconductor devices in series features high technical requirements and costs, and thus is not suitable for the application scenarios with low power and limited costs.

The conventional, common modular power supply solutions involve an input-series output-parallel (ISOP) converter, a modular multilevel converter (MMC), and a cascade converter. In the input-series output-parallel converter, the sub-module possesses both functions of transforming input and output voltages and sharing input voltage. The modular multilevel converter is constructed as a two-stage step-down structure, where the front-stage sub-module performs initial voltage reduction, and the high step-down ratio operation is usually achieved with assistance of the rear-stage converter. The cascade converter achieves a high step-down ratio via an input capacitor series structure and a converter with a voltage sharing capability.

For the input-series output-parallel converter, the degree of voltage imbalance between modules depends on the consistency of circuit parameters and the operating states of the switch transistors. In the solution of paper "High-Voltage-Input, Low-Voltage-Output, Series Connected Converters with Uniform Voltage Distribution" (2009 IEEE Aerospace Conference, Big Sky, MT, 2009, pp. 1-9), the operating state of the switch transistor is adjusted in the module based on the voltage feedback, lowering the requirement for the consistency between modules, but a central controller and a voltage measurement apparatus are required, resulting complex system structure and control. The paper "Wireless Input-Voltage-Sharing Control Strategy for Input-Series Output-Parallel (ISOP) System Based on Positive Output-Voltage Gradient Method" (IEEE Transactions on Industrial Electronics, vol. 61, no. 11, pp. 6022-630 November 2014) has proposed a voltage sharing method based on positive output-voltage gradient. According to this method, the operating state of the switch transistor is adjusted still based on the voltage feedback to achieve voltage sharing. Each module has a separate controller, and the controllers do not need to communicate with each other. However, because the input-voltage sharing effect is related to the output-voltage gradient difference between modules, as the modules increase, the input-voltage sharing effect deteriorates. In addition, in the input-series output-parallel system, each module has a high output isolation requirement, and insulation grades are designed for the system so as to be changed in different application scenarios. This is not conducive to modularity and expansion. Moreover, this solution presents a contradiction between input voltage sharing and output voltage regulation and thus is not suitable for an application scenario with a wide input voltage range, and this solution also features complex design and voltage sharing control.

The use of the modular multilevel converter is another solution in the medium-voltage and high-voltage input scenarios. The paper "Modular Multilevel Converter With Series and Parallel Module Connectivity: Topology and Control (IEEE Transactions on Power Electronics, vol. 30, no. 1, pp. 203-215, January 2015)" has proposed a modular multi-level series/parallel converter (MMSPC). The series/parallel relation between capacitors in modules is changed by changing the state of the modular switch transistor, so as to control the state of charge (SOC) of each capacitor, achieving input voltage sharing. However, each module includes two full bridges, resulting in complex structure and high costs. In addition, solutions such as the modular multi-level converter solution require the use of a central controller, feature high sampling costs and extremely high control complexity, and are difficult to use in a high step-down-ratio transaction with small power and low costs.

It is easier for the cascade converter to achieve a high step-down ratio as compared with the foregoing solutions. The paper "A high-step-down-ratio modular direct-current power supply and a control method thereof (a Chinese Patent, No. CN111740597A)" has proposed a cascade converter. The voltage sharing is achieved between any two adjacent bus capacitors to achieve the input voltage sharing of the system, thus obtaining a high step-down ratio This cascade converter has low drive and output isolation requirements without a central controller, and each module can operate independently. However, it is necessary to sample the voltage of the bus capacitor in the module for closed-loop control, resulting in complex control. At a steady state, the voltage borne by the switch transistor is relatively high and is the same as that of a bus in an individual sub-module. In addition, all modules operate in a hard-off state, resulting in significant losses. Moreover, the system lacks a self-powering portion, making it unable to supply power to its own control portion, thus limiting its practical application.

BRIEF SUMMARY OF THE INVENTION

In view of the above, to resolve the defects in the prior art: limitation in applicable voltage levels, high requirement for drive and output isolation, complex control strategies, hard switching off during operation, and lack of self-powering ability, the present invention provides a switched-capacitor type modular direct-current power supply with a high step-down ratio.

To achieve the foregoing objective, the present invention is implemented using the following technical solutions.

The present invention discloses a switched-capacitor type modular direct-current power supply with a high step-down ratio, including:

a load, an input source, an upper modular cascade circuit string formed by i upper submodule circuits and/or a lower modular cascade circuit string formed by j lower submodule circuits.

The upper submodule circuit includes a first upper main capacitor, a first lower main capacitor, a first upper switch transistor, a first lower switch transistor, a first upper diode, a first lower diode, a first resonant inductor, a first upper resonant capacitor, a first lower resonant capacitor, a first auxiliary transformer, and three upper output ports. The first upper output port, a positive electrode of the first upper main capacitor, and a drain of the first upper switch transistor are connected together, the second upper output port, a negative electrode of the first upper main capacitor, a positive electrode of the first lower main capacitor, a source of the first lower switch transistor, one end of a primary winding of the first auxiliary transformer, and a cathode of the first upper diode are connected together, the third upper output port, a negative electrode of the first lower main capacitor, and an anode of the first lower diode are connected together, a source of the first upper switch transistor, a drain of the first lower switch transistor, and a positive electrode of the first upper resonant capacitor are connected together, a negative electrode of the first upper resonant capacitor, one end of the first resonant inductor, and the other end of the primary winding of the first auxiliary transformer are connected together, an anode of the first upper diode, a cathode of the first lower diode, and a negative electrode of the first lower resonant capacitor are connected together, and the other end of the first resonant inductor is connected to a positive electrode of the first lower resonant capacitor. The upper submodule circuit further includes an independent first control module configured to control the on or off of the first upper switch transistor or the first lower switch transistor.

The lower submodule circuit includes a second upper main capacitor, a second lower main capacitor, a second upper switch transistor, a second lower switch transistor, a second upper diode, a second lower diode, a second resonant inductor, a second upper resonant capacitor, a second lower resonant capacitor, a second auxiliary transformer, and three lower output ports. The first lower output port, a positive electrode of the second upper main capacitor, and a cathode of the second upper diode are connected together, the second lower output port, a negative electrode of the second upper main capacitor, a positive electrode of the second lower main capacitor, an anode of the second lower diode, one end of a primary winding of the second auxiliary transformer, and a drain of the second upper switch transistor are connected together, the third lower output port, a negative electrode of the second lower main capacitor, and a source of the second lower switch transistor are connected together, an anode of the second upper diode, a cathode of the second lower diode, and a positive electrode of the second upper resonant capacitor are connected together, a source of the second upper switch transistor, a drain of the second lower switch transistor, and a negative electrode of the second lower resonant capacitor are connected together, a negative electrode of the second upper resonant capacitor is connected to one end of the second resonant inductor, the other end of the primary winding of the second auxiliary transformer, the other end of the second resonant inductor, and a positive electrode of the second lower resonant capacitor are connected together. The lower submodule circuit further includes an independent second control module configured to control the on or off of the second upper switch transistor or the second lower switch transistor.

The upper modular cascade circuit string includes three upper ports and the i upper submodule circuits. A first upper port is connected to a first upper output port of a first upper submodule circuit, a second upper port is connected to a third upper output port of an i-th upper submodule circuit, and a third upper port is connected to a second upper output port of the i-th upper submodule circuit. The i upper submodule circuits within the string are connected in the following manner: a second upper output port of a preceding upper submodule circuit is connected to a first upper output port of an adjacently subsequent upper submodule circuit, and a third upper output port of the preceding upper submodule circuit is connected to a second upper output port of the adjacently subsequent upper submodule circuit, i being a natural number.

The lower modular cascade circuit string includes three lower ports and the j lower submodule circuits. A first lower port is connected to a first lower output port of a first lower submodule circuit, a second lower port is connected to a second lower output port of the first lower submodule circuit, and a third lower port is connected to a third lower output port of a j-th lower submodule circuit. The j lower submodule circuits within the string are connected in the following manner: a second lower output port of a preceding lower submodule circuit is connected to a first lower output port of an adjacently subsequent lower submodule circuit, and a third lower output port of the preceding lower submodule circuit is connected to a second lower output port of the adjacently subsequent lower submodule circuit, j being a natural number.

When the switched-capacitor type modular direct-current power supply with a high step-down ratio includes both the upper modular cascade circuit string and the lower modular cascade circuit string, where $2 \leq i$ and $2 \leq j$, the modular cascade circuit strings are connected to the input source and the load in the following manner: the first upper port of the upper modular cascade circuit string is connected to a positive electrode of the input source, the third lower port of the lower modular cascade circuit string is connected to a negative electrode of the input source, the third upper port of the upper modular cascade circuit string, the first lower port of the lower modular cascade circuit string, and a positive electrode of the load are connected together, and the second upper port of the upper modular cascade circuit string, the second lower port of the lower modular cascade circuit string, and a negative electrode of the load are connected together.

When the switched-capacitor type modular direct-current power supply with a high step-down ratio includes the upper modular cascade circuit string, where $2 \leq i$ and $j=0$, the modular cascade circuit string is connected to the input source and the load in the following manner: the first upper port of the upper modular cascade circuit string is connected to the positive electrode of the input source, the third upper port of the upper modular cascade circuit string is connected to the positive electrode of the load, and the second upper port of the upper modular cascade circuit string, the negative electrode of the load, and the negative electrode of the input source are connected together.

When the switched-capacitor type modular direct-current power supply with a high step-down ratio includes the lower modular cascade circuit string, where i=0 and 2≤j, the modular cascade circuit string is connected to the input source and the load in the following manner: the first lower port of the lower modular cascade circuit string, the positive electrode of the load, and the positive electrode of the input source are connected together, the second lower port of the lower modular cascade circuit string is connected to the negative electrode of the load, and the third lower port of the lower modular cascade circuit string is connected to the negative electrode of the input source.

In an embodiment of the present invention, each of the upper submodule circuits supplies power to the first control module of the upper submodule circuit via the first auxiliary transformer.

In an embodiment of the present invention, each of the lower submodule circuits supplies power to the second control module of the lower submodule circuit via the second auxiliary transformer.

In an embodiment of the present invention, i=j, i≥2, and j≥2.

In an embodiment of the present invention, the first upper switch transistor, the second upper switch transistor, the first lower switch transistor, and the second lower switch transistor are fully-controlled power semiconductor devices.

In an embodiment of the present invention, the first upper switch transistor, the second upper switch transistor, the first lower switch transistor, and the second lower switch transistor are semi-controlled power semiconductor devices.

In an embodiment of the present invention, the first control module skips sampling a capacitor voltage or an inductor current of the upper submodule circuit, and the second control module skips sampling a capacitor voltage or an inductor current of the lower submodule circuit.

In an embodiment of the present invention, the power supply needs no central controller.

The present invention further discloses a control method for a switched-capacitor type modular direct-current power supply with a high step-down ratio, which is specifically as follows:

Each control module in the upper submodule circuit and the lower submodule circuit outputs two complementary PWM signals with a duty cycle of 50%. These two PWM signals are respectively used as control signals of an upper switch transistor and a lower switch transistor in the sub-module circuit, to enable the upper switch transistor and lower switch transistor in the upper submodule circuit and the lower submodule circuit to be turned on alternately.

For the upper submodule circuit, when a drive signal of the upper switch transistor is 1 and a drive signal of the lower switch transistor is 0, the first upper switch transistor is turned on and the first lower switch transistor is turned off. The first upper main capacitor transfers energy to the first upper resonant capacitor and the first lower resonant capacitor while a first upper bus capacitor injects the energy into the primary winding of the first auxiliary transformer, so as to supply the energy to the first control module in the upper submodule circuit. When the drive signal of the upper switch transistor is 0 and the drive signal of the lower switch transistor is 1, the first upper switch transistor is turned off and the first lower switch transistor is turned on. The first upper resonant capacitor and the first lower resonant capacitor transfer energy to the first lower main capacitor while the first upper resonant capacitor injects the energy to the primary winding of the first auxiliary transformer, so as to supply the energy to the first control module of the upper submodule circuit. In addition, during operation, the turn-off voltage withstood by the first upper switch transistor and the first lower switch transistor is only the terminal voltage of a single main capacitor, that is, half of the voltage of the sub-module circuit bus.

For the lower submodule circuit, when a drive signal of the second upper switch transistor is 0 and a drive signal of the second lower switch transistor is 1, the second upper switch transistor is turned off and the second lower switch transistor is turned on. The second lower main capacitor transfers energy to the second upper resonant capacitor and the second lower resonant capacitor while the second lower main capacitor injects the energy into the primary winding of the second auxiliary transformer, so as to supply the energy to the second control module in the lower submodule circuit. When the drive signal of the second upper switch transistor is 1 and the drive signal of the second lower switch transistor is 0, the second upper switch transistor is turned on and the second lower switch transistor is turned off. The second upper resonant capacitor and the second lower resonant capacitor transfer energy to the second upper main capacitor while the second lower resonant capacitor injects the energy to the primary winding of the second auxiliary transformer, so as to supply the energy to the second control module of the lower submodule circuit. In addition, during operation, the turn-off voltage withstood by the second upper switch transistor and the second lower switch transistor is only the terminal voltage of a single main capacitor, that is, half of the bus voltage of the lower sub-module circuit.

Based on the foregoing technical solution, compared with the related art, the present invention has the following beneficial effects:

The switched-capacitor type modular direct-current power supply with a high step-down ratio provided by the present invention is obtained by cascading standardized submodule circuits in a hierarchical manner. The voltage withstood by the switch transistor in each submodule circuit is low, and the topology of each submodule circuit is modified from a basic series resonant circuit. The power supply can adjust the number of cascaded modules based on the input voltage level, features good flexibility and strong expansion, and is suitable for low-power power supply application in medium-voltage or high-voltage direct-current input scenarios. Moreover, the submodule circuit has the self-powering ability, and the circuit in the module includes a portion that supplies power to the control module. The controller of each module unit can operate independently, and the submodules of the power supply do not need to communicate with each other and operate synchronously. This allows for standardized modular design and strong expansion.

Additionally, the switch transistor of the non-isolated three-terminal switched-capacitor resonant circuit used has low voltage stress and is simple in shape, allowing for fewer modules connected in series under the same input voltage. Furthermore, the input voltage sharing between the series connected capacitors of the power supply and the soft switch operation of the switch transistor can be achieved without the need to measure the voltage or current when the control module of the module circuit controls the switch transistor. The present invention is simple in structure and to control, has self-powering ability and low solution costs, and is easy to implement. The switched-capacitor type modular direct-current power supply with a high step-down ratio includes no central controller, each module operates independently, and the system can also operate normally without an extra controller to uniformly regulate all the controllers in the submodules.

DETAILED DESCRIPTION OF THE INVENTION

To make the foregoing descriptions, features, and advantages of the power supply in the present invention clearer, the present invention is described in detail below with reference to the accompanying drawings and a specific power supply embodiment. The technical features of various implementations in the present invention can be combined correspondingly, provided that there is no conflict among them.

A switched-capacitor type modular direct-current power supply with a high step-down ratio described in the present invention includes a load, an input source, an upper modular cascade circuit string formed by i upper submodule circuits and/or a lower modular cascade circuit string formed by j lower submodule circuits. Each submodule circuit includes an independent control module, and the control module generates two complementary PWM waves with a duty cycle of 50% as drive signals of switch transistors in the submodule, enabling two switch transistors to be turned on in a complementary manner.

Figure 1:
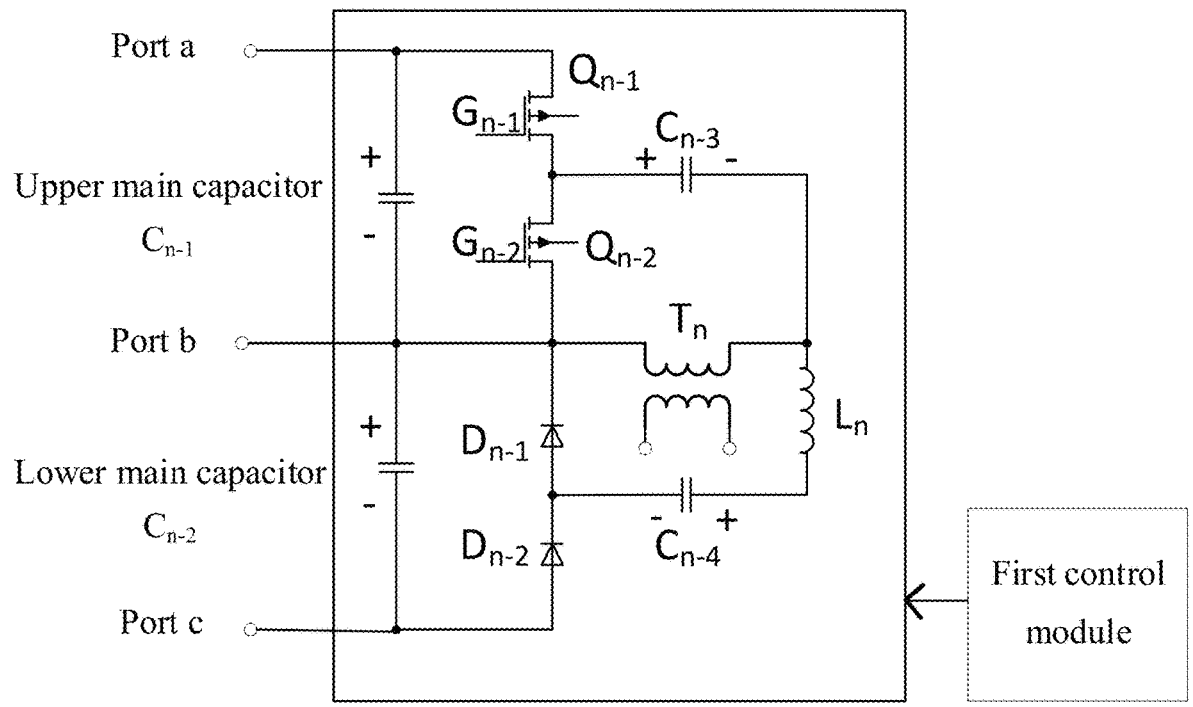
FIG. 1 is a topological diagram of an upper submodule circuit according to an embodiment of the present invention.

FIG. 1 shows the topology of an upper submodule circuit. The upper submodule circuit includes three upper output ports a, b, and c and an independent control module. The circuit is connected as follows: The first upper output port a, a positive electrode of a first upper main capacitor $C_{n-1}$, and a drain of a first upper switch transistor $Q_{n-1}$ are connected together. The second upper output port b, a negative electrode of the first upper main capacitor $C_{n-1}$, a positive electrode of a first lower main capacitor $C_{n-2}$, a source of a first lower switch transistor $Q_{n-2}$, a cathode of a first upper diode $D_{n-1}$, and one end of a primary winding of a first auxiliary transformer $T_n$ are connected together. The third upper output port c, a negative electrode of the first lower main capacitor $C_{n-2}$, and an anode of the first lower diode $D_{n-2}$ are connected together. A source of the first upper switch transistor $Q_{n-1}$, a drain of the first lower switch transistor $Q_{n-2}$, and a positive electrode of the first upper resonant capacitor $C_{n-3}$ are connected together. A negative electrode of the first upper resonant capacitor $C_{n-3}$, one end of the primary winding of the first auxiliary transformer $T_n$, and one end of the first resonant inductor Ln are connected together. An anode of the first upper diode $D_{n-1}$, a cathode of the first lower diode $D_{n-2}$, and a negative electrode of the first lower resonant capacitor $C_{n-4}$ are connected together. The other end of the first resonant inductor Ln is connected to a positive electrode of the first lower resonant capacitor $C_{n-4}$.

In this embodiment, the first upper switch transistor and the first lower switch transistor may be fully-controlled power semiconductor devices or semi-controlled power semiconductor devices. Each upper submodule circuit supplies power to the control module via the auxiliary transformer. The control module skips sampling a capacitor voltage or an inductor current in the upper submodule circuit.

Figure 2:
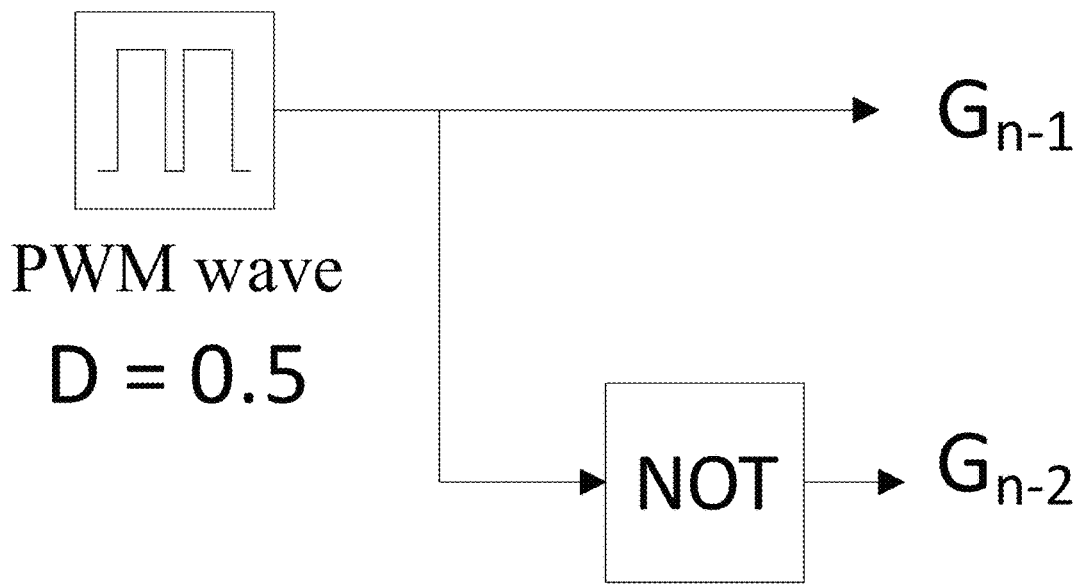
FIG. 2 is a block diagram of a control module of an upper submodule circuit according to an embodiment of the present invention.

FIG. 2 is a block diagram of a control module of an upper submodule circuit. The control module outputs two PWM signals $G_{n-1}$ and $G_{n-2}$ with a duty cycle of 50% as control signals of the first upper switch transistor $Q_{n-1}$ and the first lower switch transistor $Q_{n-2}$, enabling the two switch transistors to be turned on in a complementary manner.

Figure 3:
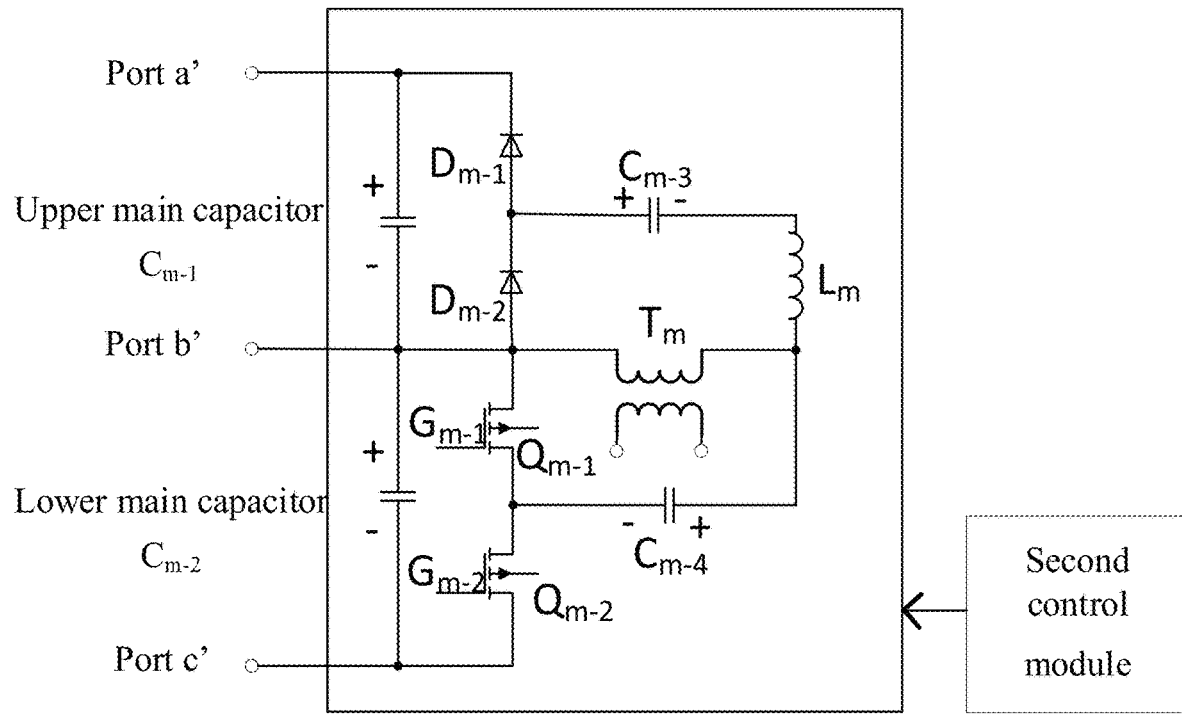
FIG. 3 is a topological diagram of a lower submodule circuit according to an embodiment of the present invention.

FIG. 3 shows the topology of a lower submodule circuit. The lower submodule circuit includes three lower output ports a', b', and c' and an independent control module. The circuit is connected as follows: The first lower output port a', a positive electrode of a second upper main capacitor $C_{m-1}$, and a cathode of a second upper diode $D_{m-1}$ are connected together. The second lower output port b', a negative electrode of the second upper main capacitor $C_{m-1}$, a positive electrode of the second lower main capacitor $C_{m-2}$, an anode of the second lower diode $D_{m-2}$, a drain of the second upper switch transistor $Q_{m-1}$, and one end of a primary winding of the second auxiliary transformer $T_m$ are connected together. The third lower output port c', a negative electrode of the second lower main capacitor $C_{m-2}$, and a source of the second lower switch transistor $Q_{m-2}$ are connected. An anode of the second upper diode $D_{m-1}$, a cathode of the second lower diode $D_{m-1}$, and a positive electrode of the second upper resonant capacitor $C_{m-3}$ are connected together. A source of the second upper switch transistor $Q_{m-1}$, a drain of the second lower switch transistor $Q_{m-2}$, and a negative electrode of the second lower resonant capacitor $C_{m-4}$ are connected together. One end of a second resonant inductor $L_m$ is connected to a negative electrode of the second upper resonant capacitor $C_{m-3}$. The other end of the second resonant inductor $L_m$, the other end of the primary winding of the second auxiliary transformer $T_m$, and a positive electrode of the second lower resonant capacitor $C_{m-4}$ are connected.

In this embodiment, the second upper switch transistor and the second lower switch transistor may be fully-controlled power semiconductor devices or semi-controlled power semiconductor devices. Each lower submodule circuit supplies power to the control module via the auxiliary transformer. The control module skips sampling a capacitor voltage or an inductor current in the lower submodule circuit.

Figure 4:
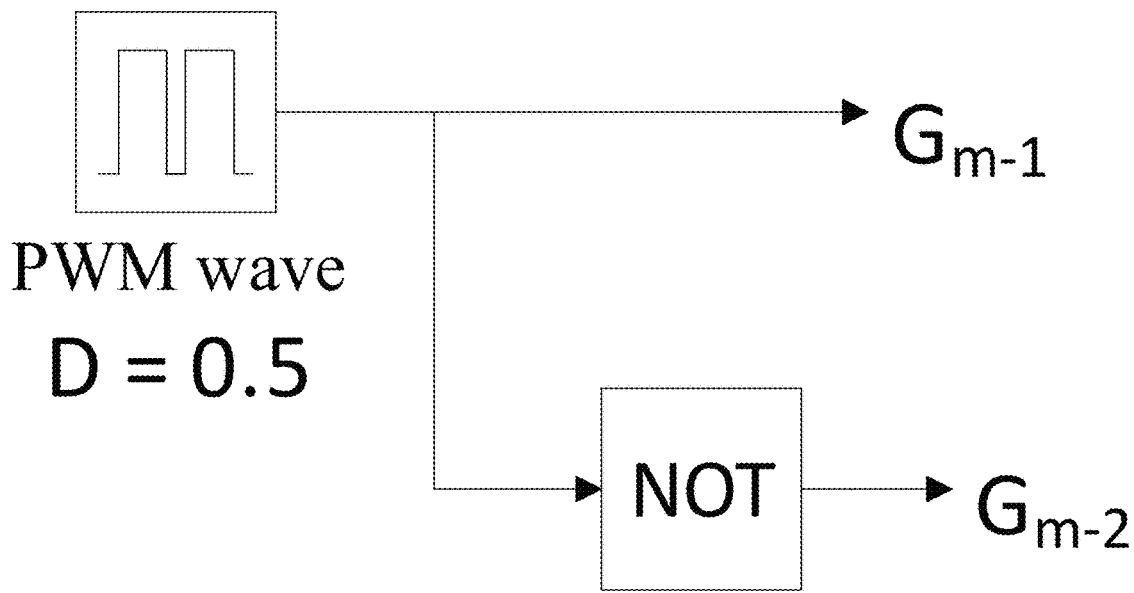
FIG. 4 is a block diagram of a control module of a lower submodule circuit according to an embodiment of the present invention.

FIG. 4 is a block diagram of a control module of a lower submodule circuit. The control module outputs two complementary PWM signals $G_{m-1}$ and $G_{m-2}$ with a duty cycle of 50% as control signals of the upper switch transistor $Q_{m-1}$ and the lower switch transistor $Q_{m-2}$, enabling the two switch transistors to be turned on in a complementary manner.

Figure 5:
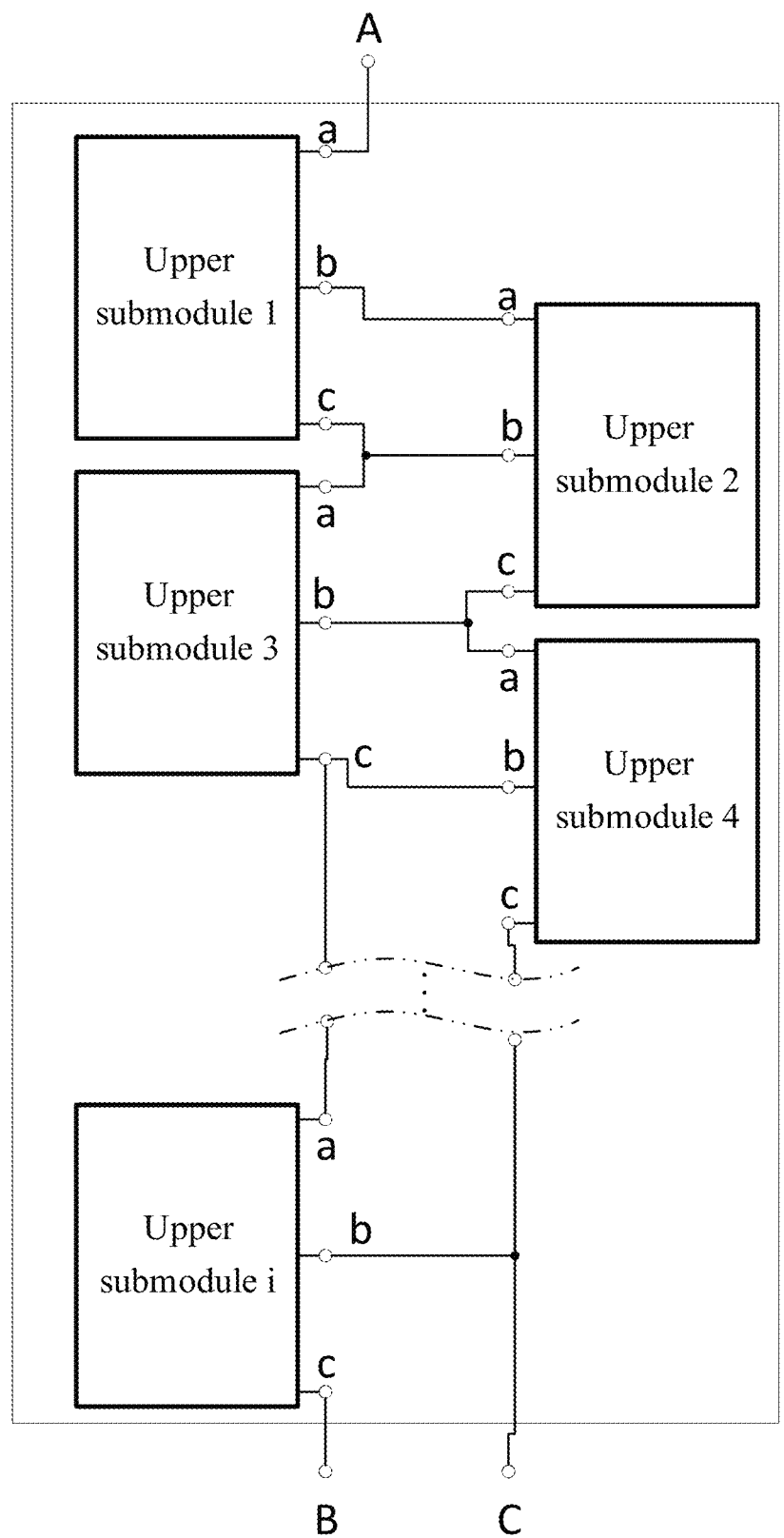
FIG. 5 is a diagram of connection in an upper modular cascade circuit string of a switched-capacitor type modular direct-current power supply with a high step-down ratio according to an embodiment of the present invention.

FIG. 5 is a diagram of connection in an upper modular cascade circuit string of a switched-capacitor type modular direct-current power supply with a high step-down ratio according to an embodiment of the present invention. FIG. 5 shows i upper submodule circuits, where i>4. In practical application, i may be a natural number greater than or equal to 2. A first upper port A of the upper modular cascade circuit string is connected to a first upper output port a of an upper submodule circuit 1, a second upper port B of the upper modular cascade circuit string is connected to a third upper output port c of the upper submodule circuit i, and a third upper port C of the upper modular cascade circuit string is connected to the second upper output port b of the upper submodule circuit 1. The connection mode in the modular cascade circuit string is as follows: The second upper output port b of a preceding upper submodule circuit is connected to the first upper output port a of an adjacently subsequent upper submodule circuit, and the third upper output port c of the preceding upper submodule circuit is connected to the second upper output port b of the adjacently subsequent upper submodule circuit.

Figure 6:
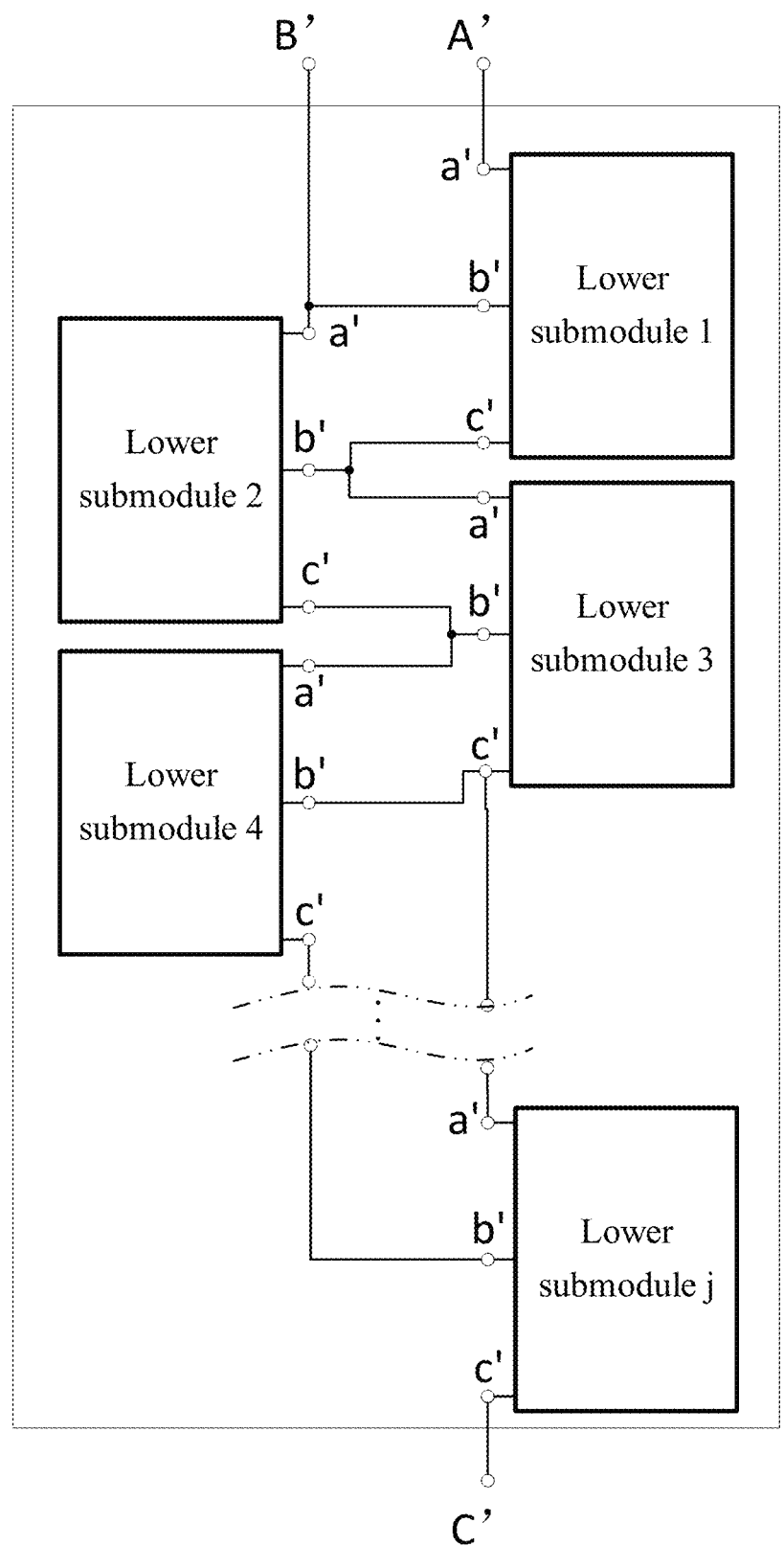
FIG. 6 is a diagram of connection in a lower modular cascade circuit string of a switched-capacitor type modular direct-current power supply with a high step-down ratio according to an embodiment of the present invention.

FIG. 6 is a diagram of connection in a lower modular cascade circuit string of a switched-capacitor type modular direct-current power supply with a high step-down ratio according to an embodiment of the present invention. FIG. 6 shows j lower submodule circuits, where j>4. In practical application, j may be a natural number greater than or equal to 2. A first lower port A' of the lower modular cascade circuit string is connected to a first lower output port a' of a lower submodule circuit 1, a second lower port B' of the lower modular cascade circuit string is connected to a second lower output port b' of the lower submodule circuit 1, and a third lower port C' of the upper modular cascade circuit string is connected to the third lower output port c' of the lower submodule circuit j. The connection mode in the modular cascade circuit string is as follows: A second lower output port b' of a preceding lower submodule circuit is connected to a first lower output port a' of an adjacently subsequent lower submodule circuit, and a third lower output port c' of the preceding lower submodule circuit is connected to a second lower output port b' of the adjacently subsequent lower submodule circuit.

Figure 7:
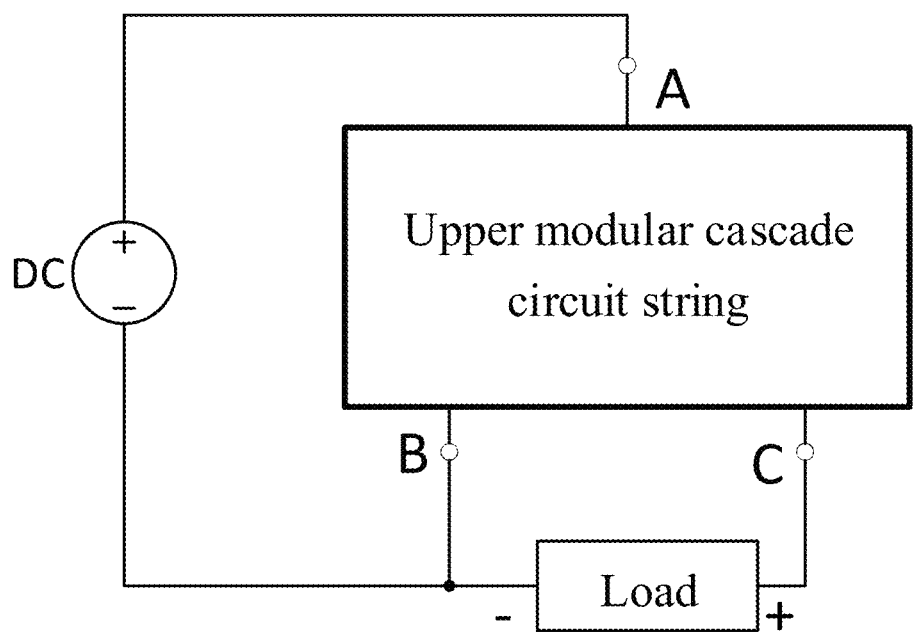
FIG. 7 is one of three typical system-connection diagrams of a switched-capacitor type modular direct-current power supply with a high step-down ratio according to an embodiment of the present invention.

FIG. 7 is a system connection diagram when a switched-capacitor type modular direct-current power supply with a high step-down ratio cascades an upper module string according to an embodiment of the present invention. The number i of upper submodule circuits is not equal to 0, and the number j of lower submodule circuits is equal to 0. A first upper port A of an upper modular cascade circuit string is connected to a positive electrode of an input source, a second upper port B of the upper modular cascade circuit string, a negative electrode of the load, and a negative electrode of the input source are connected together, and a third upper port C of the upper modular cascade circuit string is connected to a positive electrode of the load.

Figure 8:
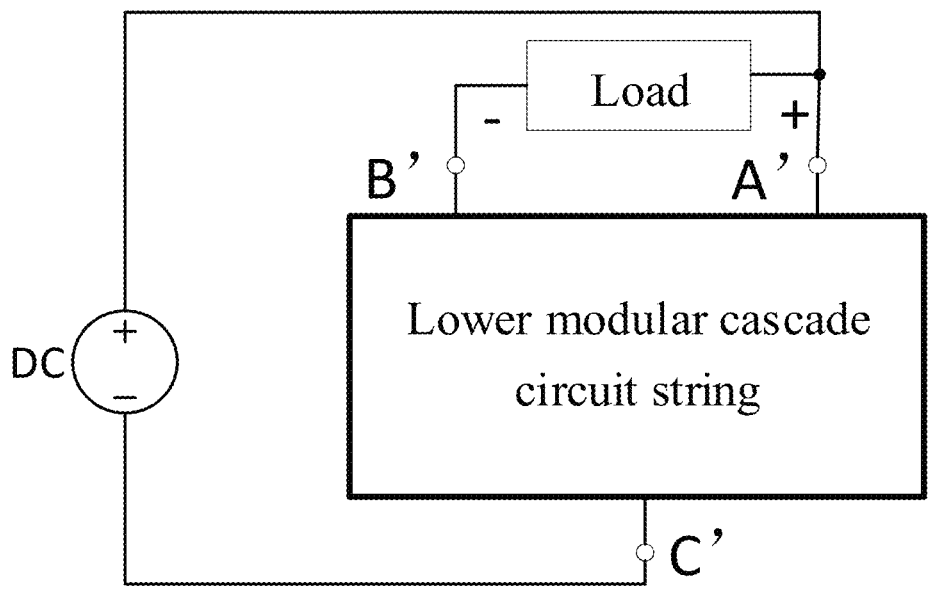
FIG. 8 is one of three typical system-connection diagrams of a switched-capacitor type modular direct-current power supply with a high step-down ratio according to an embodiment of the present invention.

FIG. 8 is a system connection diagram when a switched-capacitor type modular direct-current power supply with a high step-down ratio cascades a lower module string according to an embodiment of the present invention. The number i of upper submodule circuits is equal to 0, and the number j of lower submodule circuits is not equal to 0. A first lower port A' of the lower modular cascade circuit string, a positive electrode of the load, and a positive electrode of an input source are connected together, a second lower port B' of the lower modular cascade circuit string is connected to the negative electrode of the load, and a third lower port C' of the lower modular cascade circuit string is connected to the negative electrode of the input source.

Figure 9:
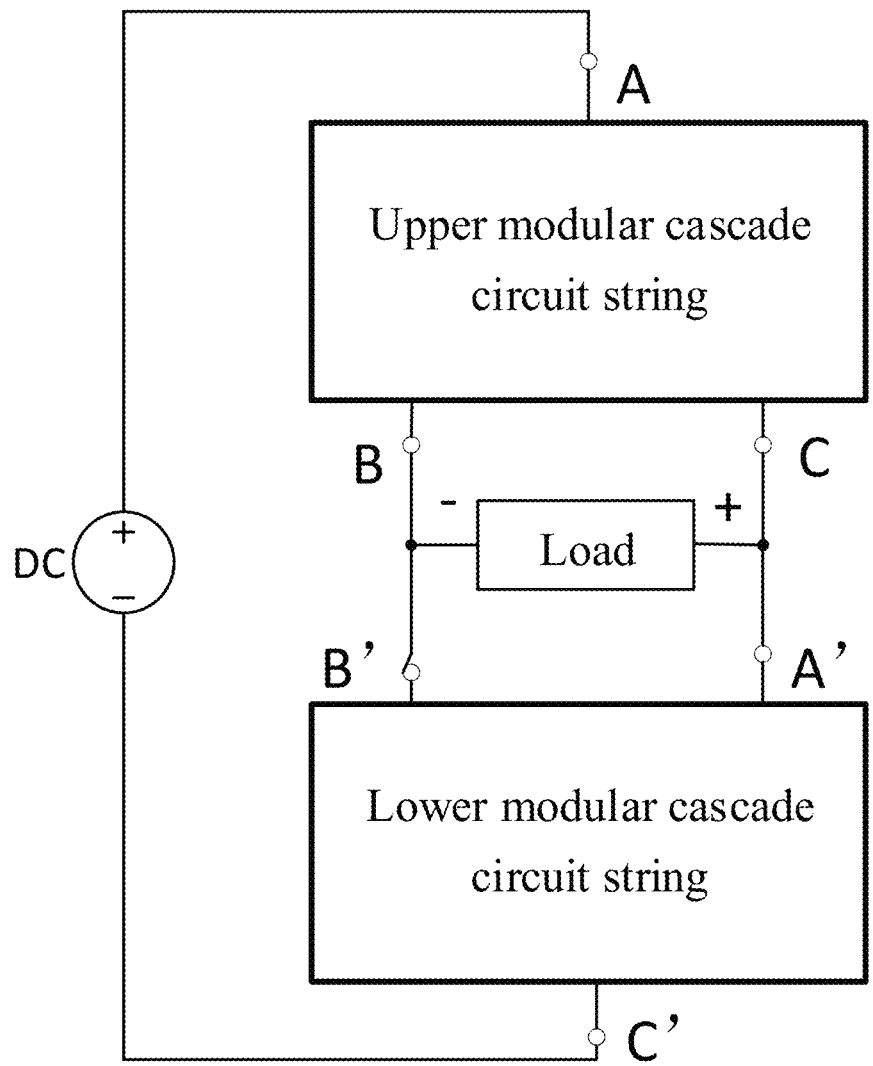
FIG. 9 is one of three typical system-connection diagrams of a switched-capacitor type modular direct-current power supply with a high step-down ratio according to an embodiment of the present invention.

FIG. 9 is a system connection diagram when a switched-capacitor type modular direct-current power supply with a high step-down ratio mixedly cascades upper and lower module strings according to an embodiment of the present invention. The numbers of upper and lower submodule circuits are neither 0. A first upper port A of the upper modular cascade circuit string is connected to a positive electrode of the input source, the third lower port C' of the lower modular cascade circuit string is connected to a negative electrode of the input source, the third upper port C of the upper modular cascade circuit string, the first lower port A' of the lower modular cascade circuit string, and a positive electrode of the load are connected together, and the second upper port B of the upper modular cascade circuit string, the second lower port B' of the lower modular cascade circuit string, and a negative electrode of the load are connected together.

Using four submodules as an example, when the switched-capacitor type modular direct-current power supply with a high step-down ratio in an embodiment of the present invention uses the method of cascading an upper modular string, the system connection is shown in FIG. 7, where i=4, and j=0. When the switched-capacitor type modular direct-current power supply with a high step-down ratio in an embodiment of the present invention uses the method of cascading a lower modular string, the system connection is shown in FIG. 8, where i=0, and j=4. When the switched-capacitor type modular direct-current power supply with a high step-down ratio in an embodiment of the present invention uses the method of cascading upper and lower modular strings, the system connection is shown in FIG. 9, where i=2, and j=2.

Figure 10:
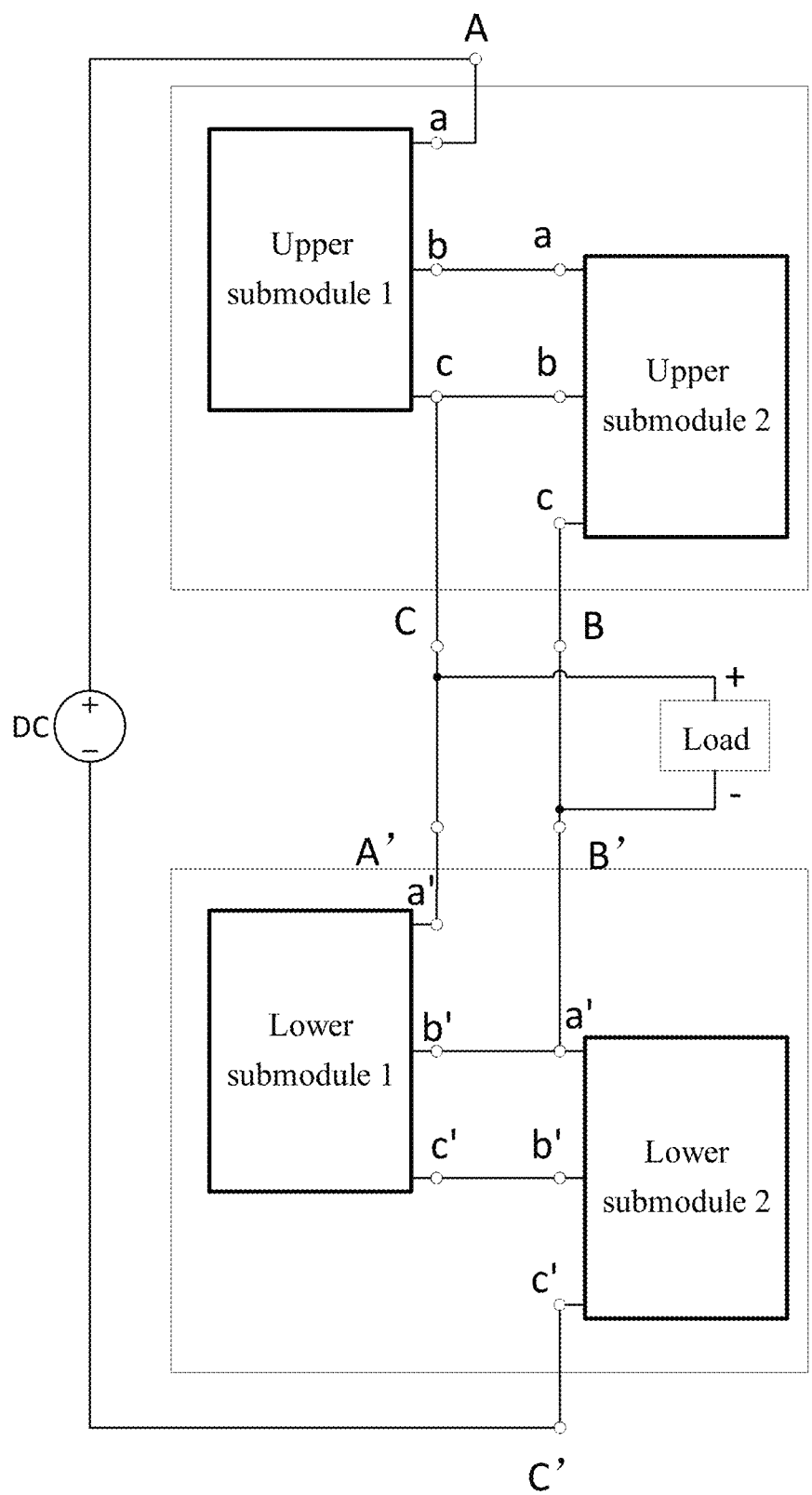
FIG. 10 is a system block diagram of a switched-capacitor type modular direct-current power supply with a high step-down ratio according to an embodiment of the present invention.

FIG. 10 is a system connection diagram of a switched-capacitor type modular direct-current power supply with a high step-down ratio according to an embodiment of the present invention, the upper and lower modular strings are cascaded in this embodiment and i=j=2. Simulation verification for the exemplary power supply is performed below with a direct-current power-supply voltage of 10 kV and a load of 2 kΩ. The exemplary power supply includes five input series capacitors, and thus the voltage across each capacitor and the output voltage of the switched-capacitor type modular direct-current power supply with a high step-down ratio in this embodiment should be 2 kV.

Figure 11:
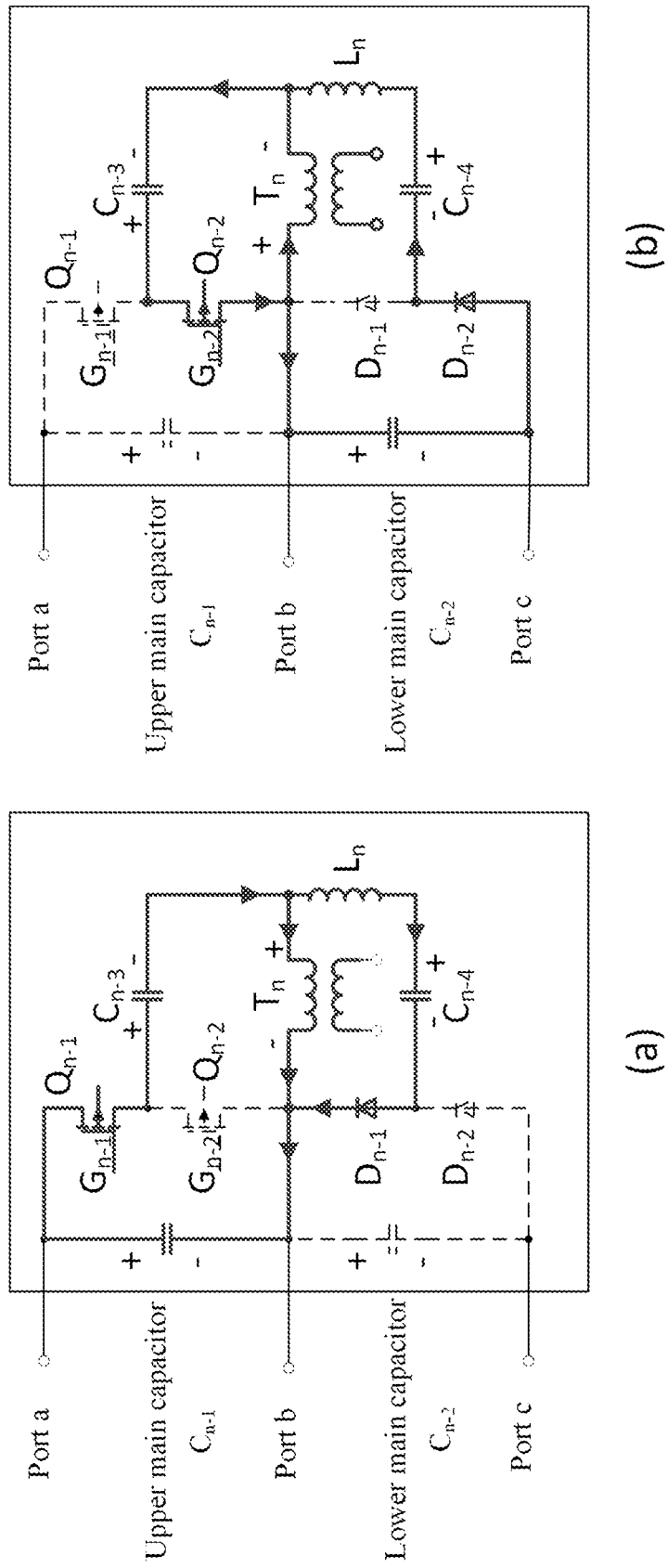
FIG. 11 is a schematic diagram of voltage sharing and self-powering processes of an upper submodule circuit in a switched-capacitor type modular direct-current power supply with a high step-down ratio according to an embodiment of the present invention. (a) is a schematic diagram of a charge loop when an upper main capacitor charges an upper resonant capacitor, a lower resonant capacitor, and a primary winding of an auxiliary transformer, and (b) is a schematic diagram of a charge loop when the upper resonant capacitor and the lower resonant capacitor charge a lower main capacitor and the upper resonant capacitor charges the primary winding of the auxiliary transformer.

FIGS. 13 (*a*) to (*d*) are respectively oscillograms of drive signal and resonant inductor current, in a period, of switch transistors in an upper sub-module 1, an upper submodule 2, a lower submodule 1, and a lower submodule 2 of the switched-capacitor type modular direct-current power supply with a high step-down ratio in FIG. 10 according to an embodiment of the present invention. The oscillograms in each figure respectively represent a drive signal of an upper switch transistor of a submodule circuit (indicated by a black solid line), a drive signal of a lower switch transistor of the submodule circuit (indicated by a black dashed line), and a resonant inductor current of the submodule circuit (indicated by a black dotted line). It can be seen from the figures that the drive signals of the upper switch transistors in the submodules have different phases, and therefore the operations of the switch transistors of the submodules are not synchronized. The control portion of the submodule generates two complementary squarewaves with a duty cycle of 50% as control signals of switch transistors, enabling the two switch transistors to be turned on in a complementary manner. For the upper submodule circuit, when the drive signal of the upper switch transistor is 1 and a drive signal of the lower switch transistor is 0, the upper switch transistor is turned on, the lower switch transistor is turned off, and the upper main capacitor discharges into a resonant branch. When the drive signal of the upper switch transistor is 0 and a drive signal of the lower switch transistor is 1, the upper switch transistor is turned off, the lower switch transistor is turned on, and the resonant branch discharges into the lower main capacitor. The power sharing process of the upper submodule is shown in FIG. 11. For the lower submodule circuit, when the drive signal of the upper switch transistor is 0 and a drive signal of the lower switch transistor is 1, the upper switch transistor is turned off, the lower switch transistor is turned on, and the lower main capacitor discharges into a resonant branch. When the drive signal of the upper switch transistor is 1 and a drive signal of the lower switch transistor is 0, the upper switch transistor is turned on, the lower switch transistor is turned off, and the resonant branch discharges into the upper main capacitor. The power sharing process of the upper submodule is as schematically shown in FIG. 12.

FIGS. 14 (*a*) to (*d*) are respectively oscillograms of drive signal of a switch transistor and terminal voltage, that is of a primary winding of an auxiliary transformer, of an upper sub-module 1, an upper submodule 2, a lower submodule 1, and a lower submodule 2 in the switched-capacitor type modular direct-current power supply with a high step-down ratio in FIG. 10 according to an embodiment of the present invention. The oscillograms in each figure respectively represent a drive signal of an upper switch transistor of a submodule circuit (indicated by a black solid line), a drive signal of a lower switch transistor of the submodule circuit (indicated by a black dashed line), and the terminal voltage of the primary winding of the auxiliary transformer of the submodule circuit (indicated by a black dotted line). The control portion of the submodule generates two complementary squarewaves with a duty cycle of 50% as control signals of switch transistors, enabling the two switch transistors to be turned on in a complementary manner. For the upper submodule circuit, when the drive signal of the upper switch transistor is 1 and a drive signal of the lower switch transistor is 0, the upper switch transistor is turned on, the lower switch transistor is turned off, and the upper main capacitor supplies power to the primary winding of the auxiliary transformer. When the drive signal of the upper switch transistor is 0 and a drive signal of the lower switch transistor is 1, the upper switch transistor is turned off, the lower switch transistor is turned on, and the upper resonant capacitor supplies power to the primary winding of the auxiliary transformer. The process of the upper submodule supplying power to the primary winding of the auxiliary transformer is shown in FIG. 11. For the lower submodule circuit, when the drive signal of the upper switch transistor is 0 and a drive signal of the lower switch transistor is 1, the upper switch transistor is turned off, the lower switch transistor is turned on, and the lower main capacitor discharges into the primary winding of the auxiliary transformer. When the drive signal of the upper switch transistor is 1 and a drive signal of the lower switch transistor is 0, the upper switch transistor is turned on, the lower switch transistor is turned off, and the lower resonant capacitor supplies power to the primary winding of the auxiliary transformer.

Figure 12:
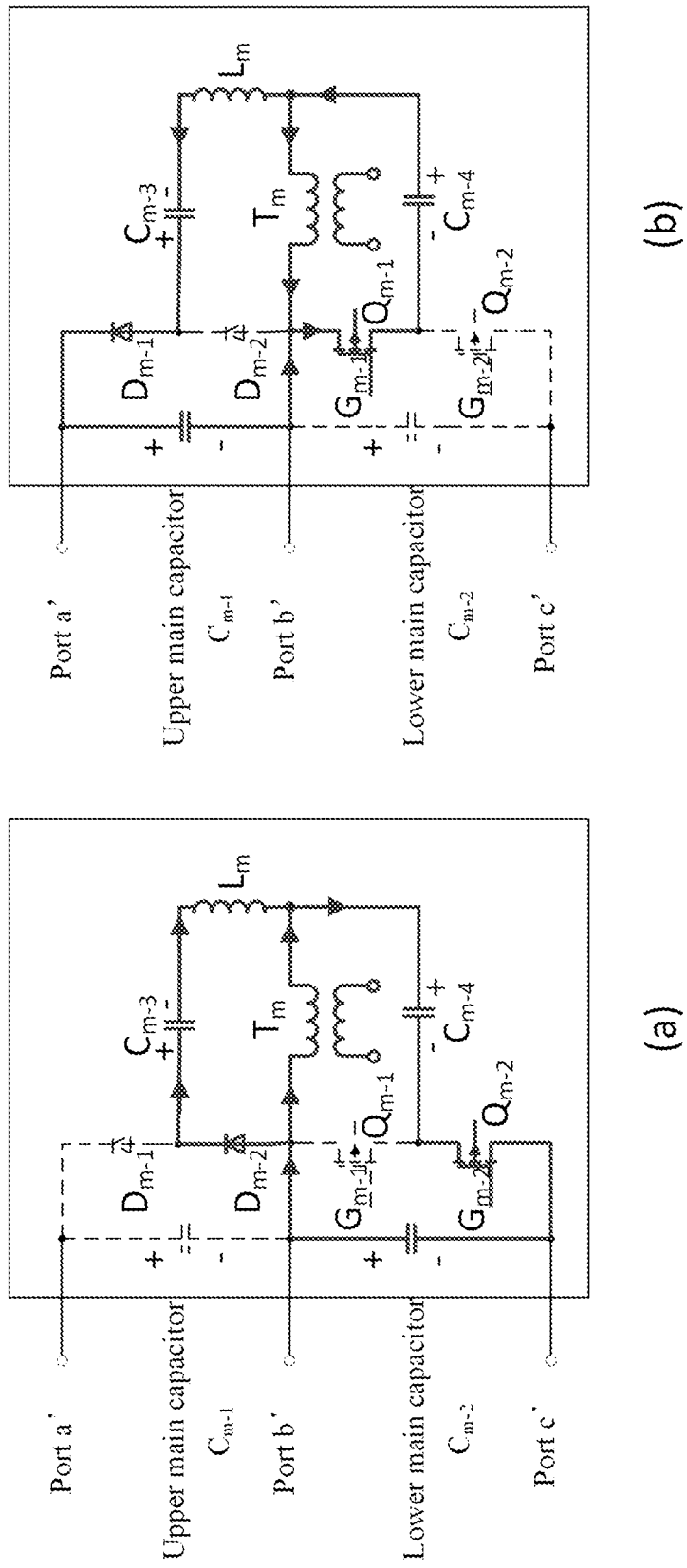
FIG. 12 is a schematic diagram of voltage sharing and self-powering processes of a lower submodule circuit in a switched-capacitor type modular direct-current power supply with a high step-down ratio according to an embodiment of the present invention. (a) is a schematic diagram of a charge loop when a lower main capacitor charges an upper resonant capacitor, a lower resonant capacitor, and a primary winding of an auxiliary transformer, and (b) is a schematic diagram of a charge loop when the upper resonant capacitor and the lower resonant capacitor charge an upper main capacitor and the lower resonant capacitor charges the primary winding of the auxiliary transformer.
Figure 13A:
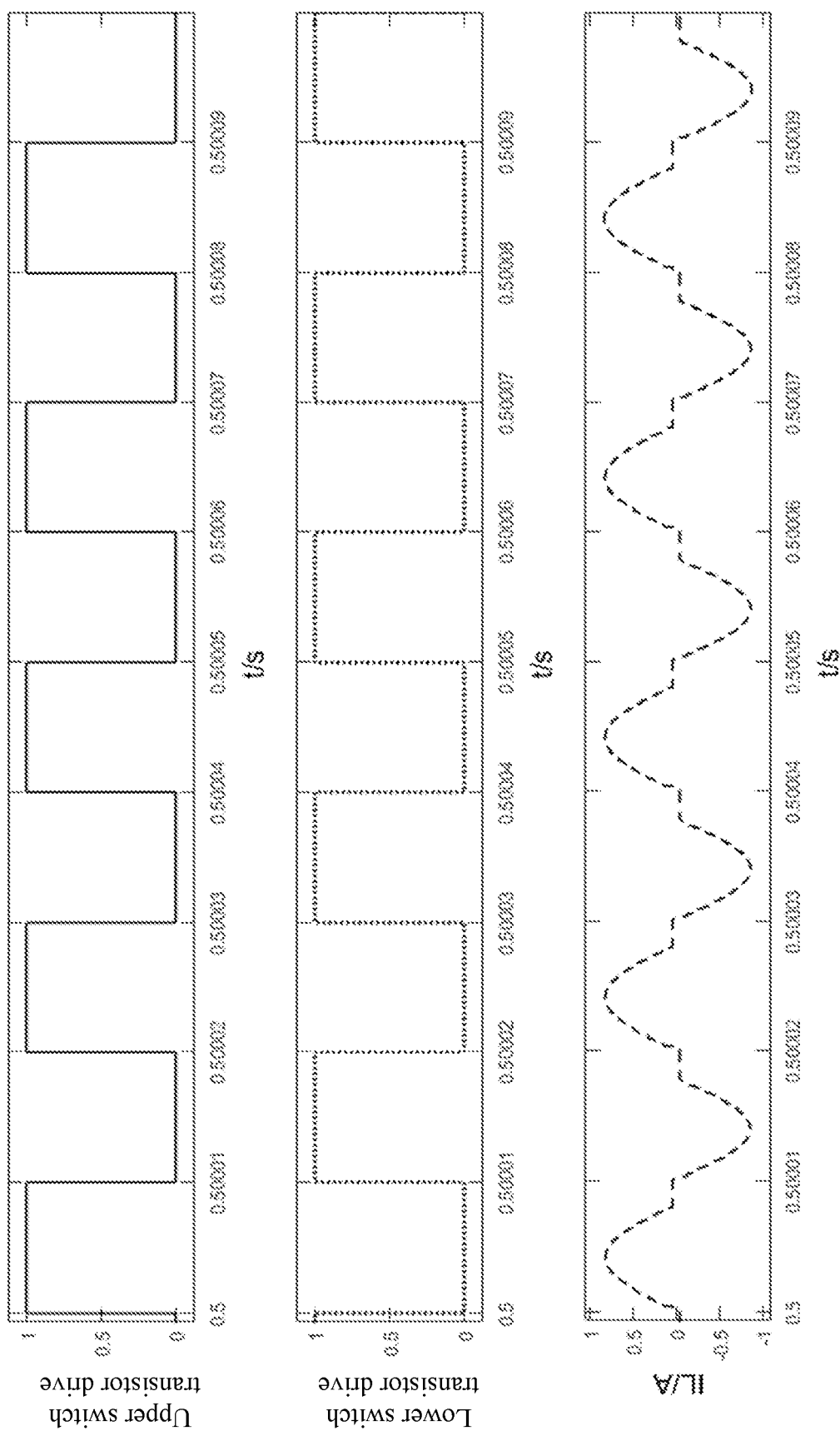
FIGS. 13 (a) to (d) are respectively oscillograms of drive signal and resonant inductor current of an upper sub-module 1, an upper submodule 2, a lower submodule 1, and a lower submodule 2 in the switched-capacitor type modular direct-current power supply with a high step-down ratio in FIG. 10 according to an embodiment of the present invention.
Figure 13B:
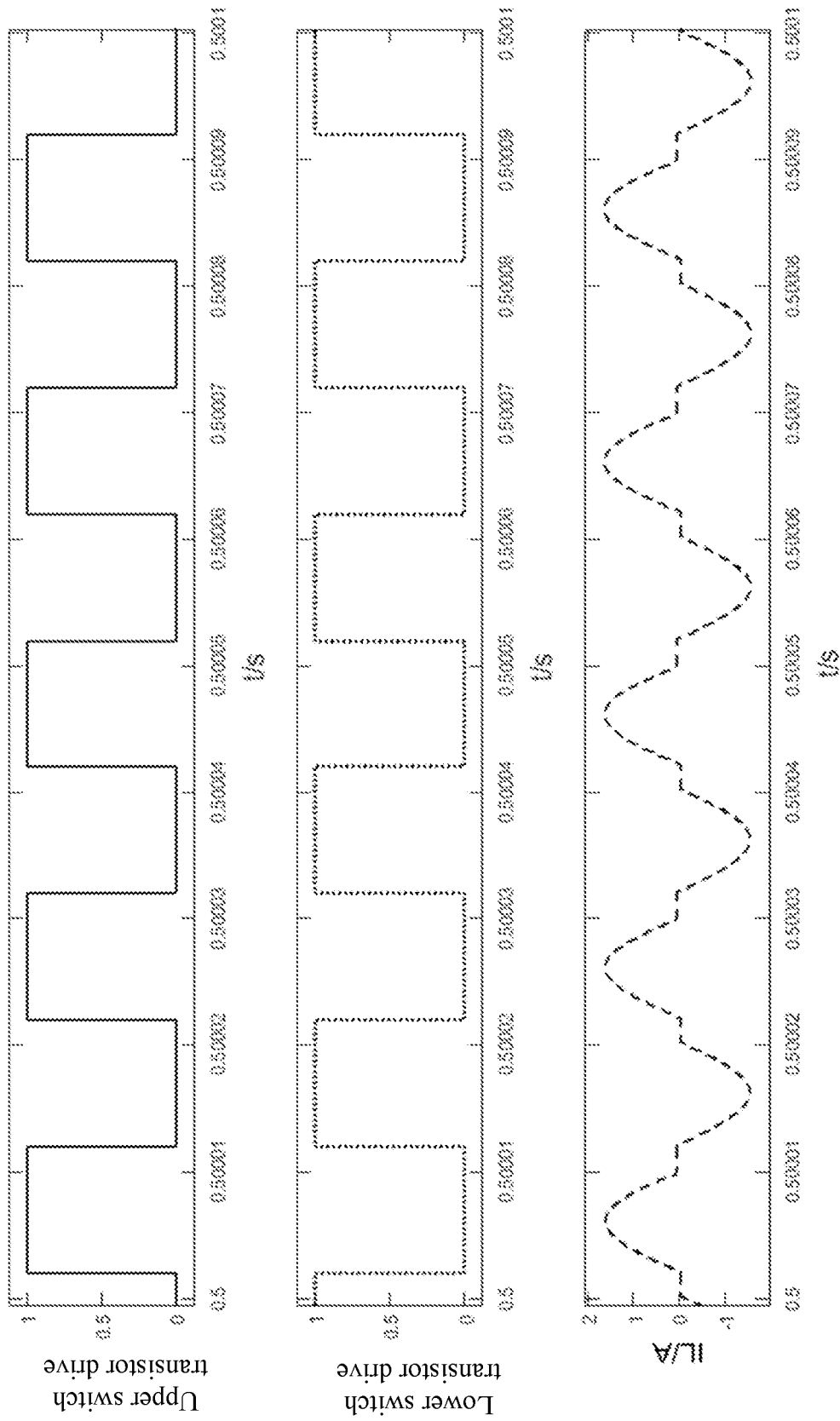
Figure 13C:
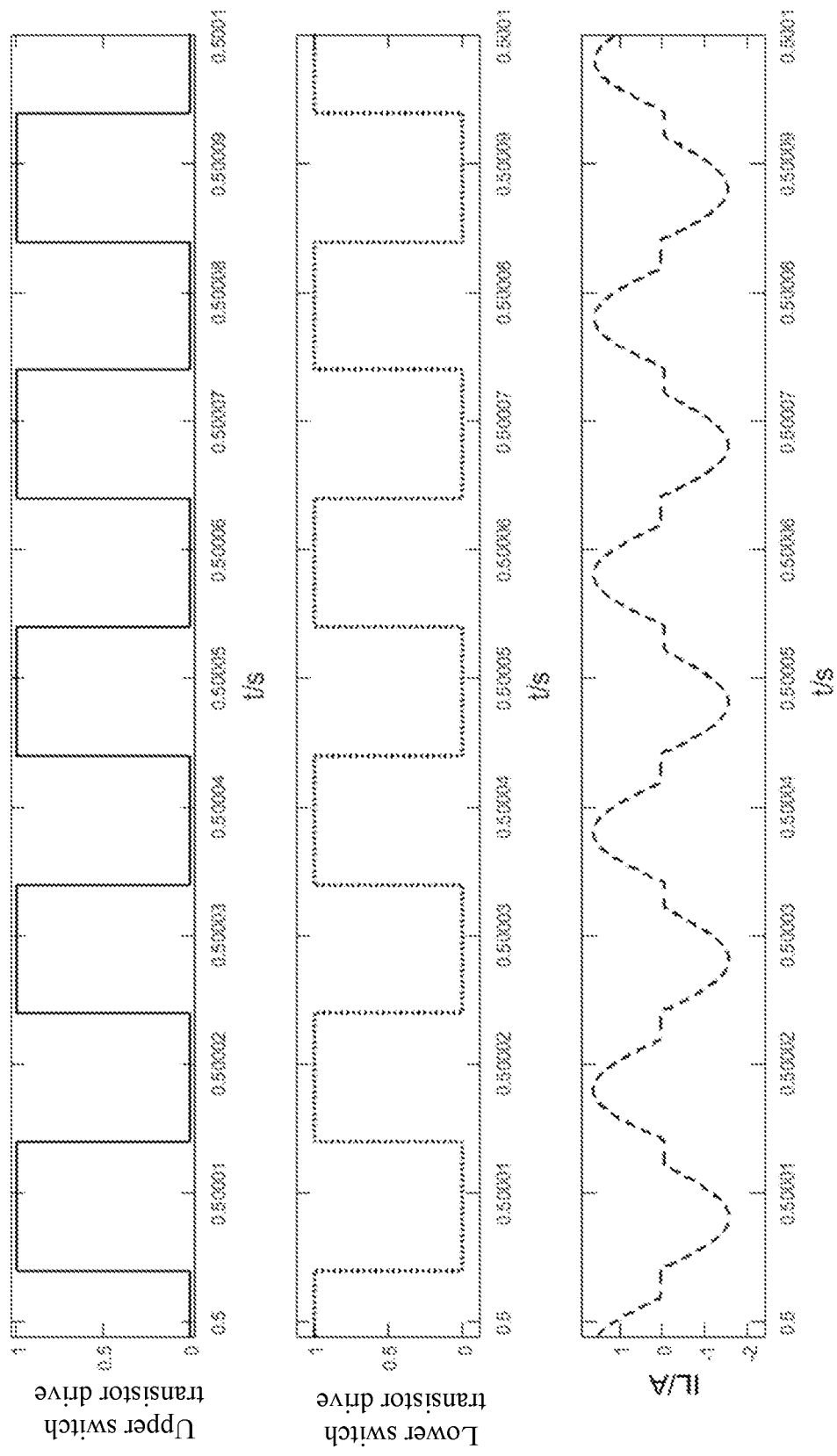
Figure 13D:
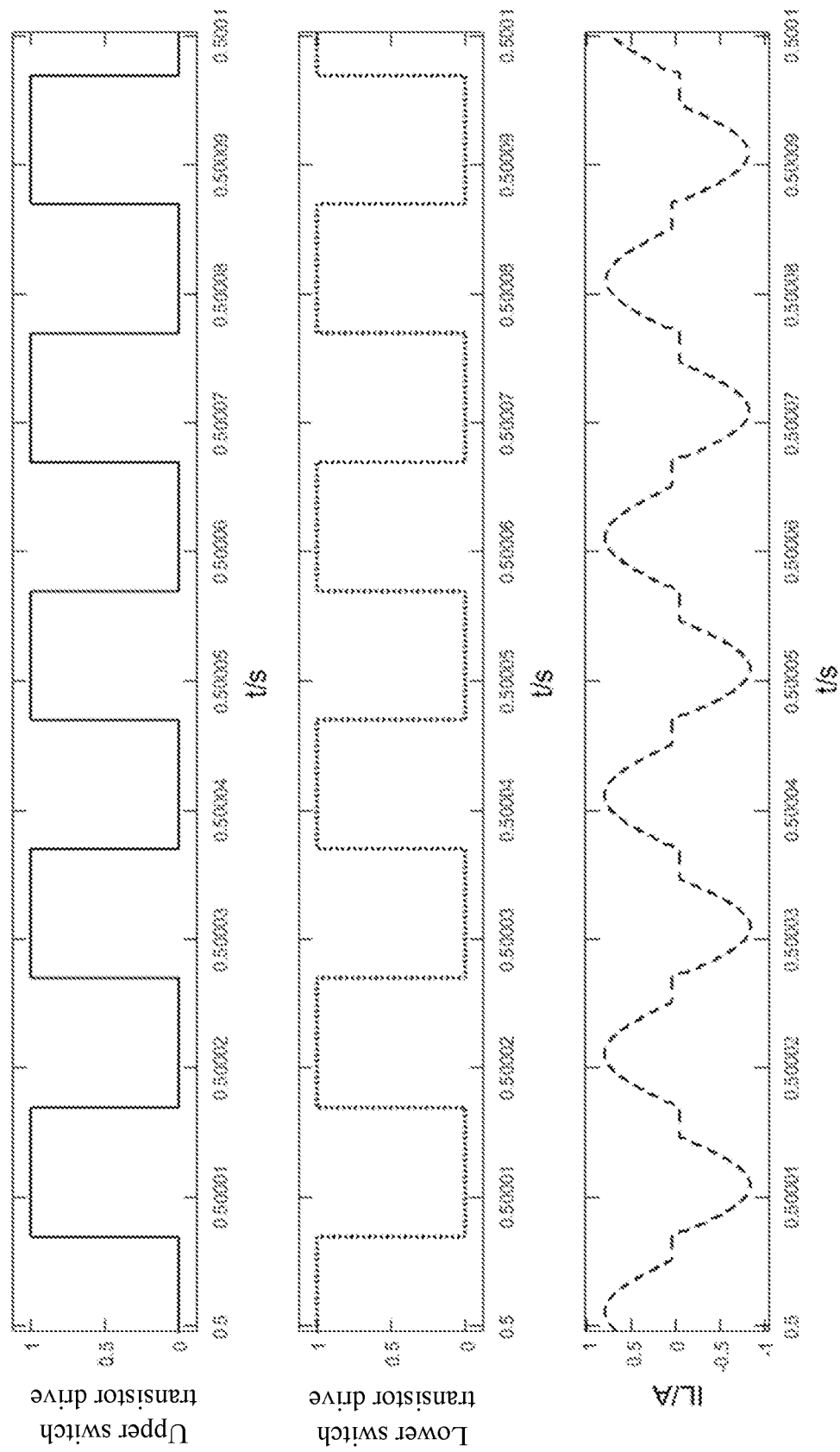
Figure 14A:
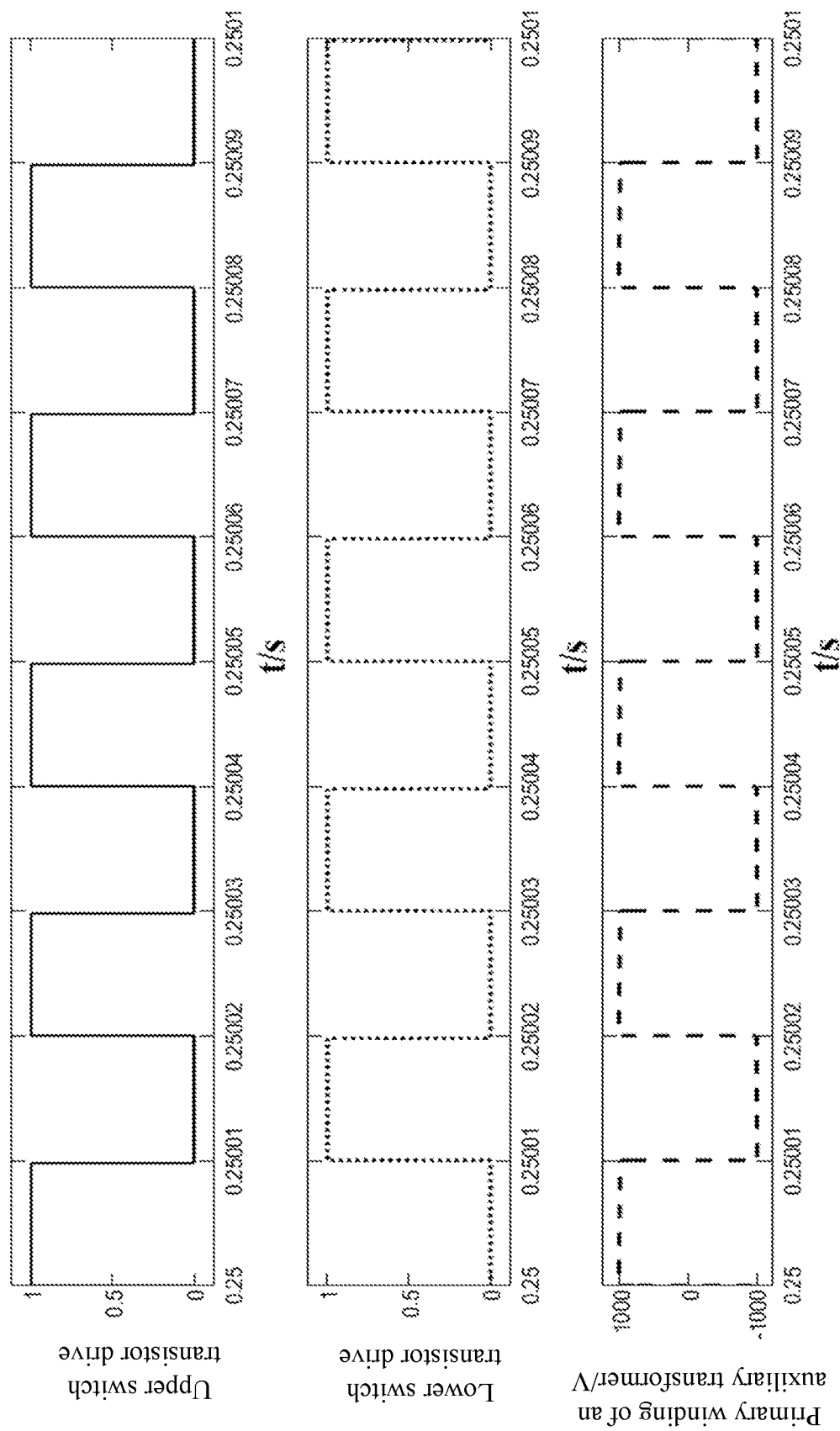
FIGS. 14 (a) to (d) are respectively oscillograms of drive signal and voltage, that is of a primary winding of an auxiliary transformer, of an upper sub-module 1, an upper submodule 2, a lower submodule 1, and a lower submodule 2 in the switched-capacitor type modular direct-current power supply with a high step-down ratio in FIG. 10 according to an embodiment of the present invention.
Figure 14B:
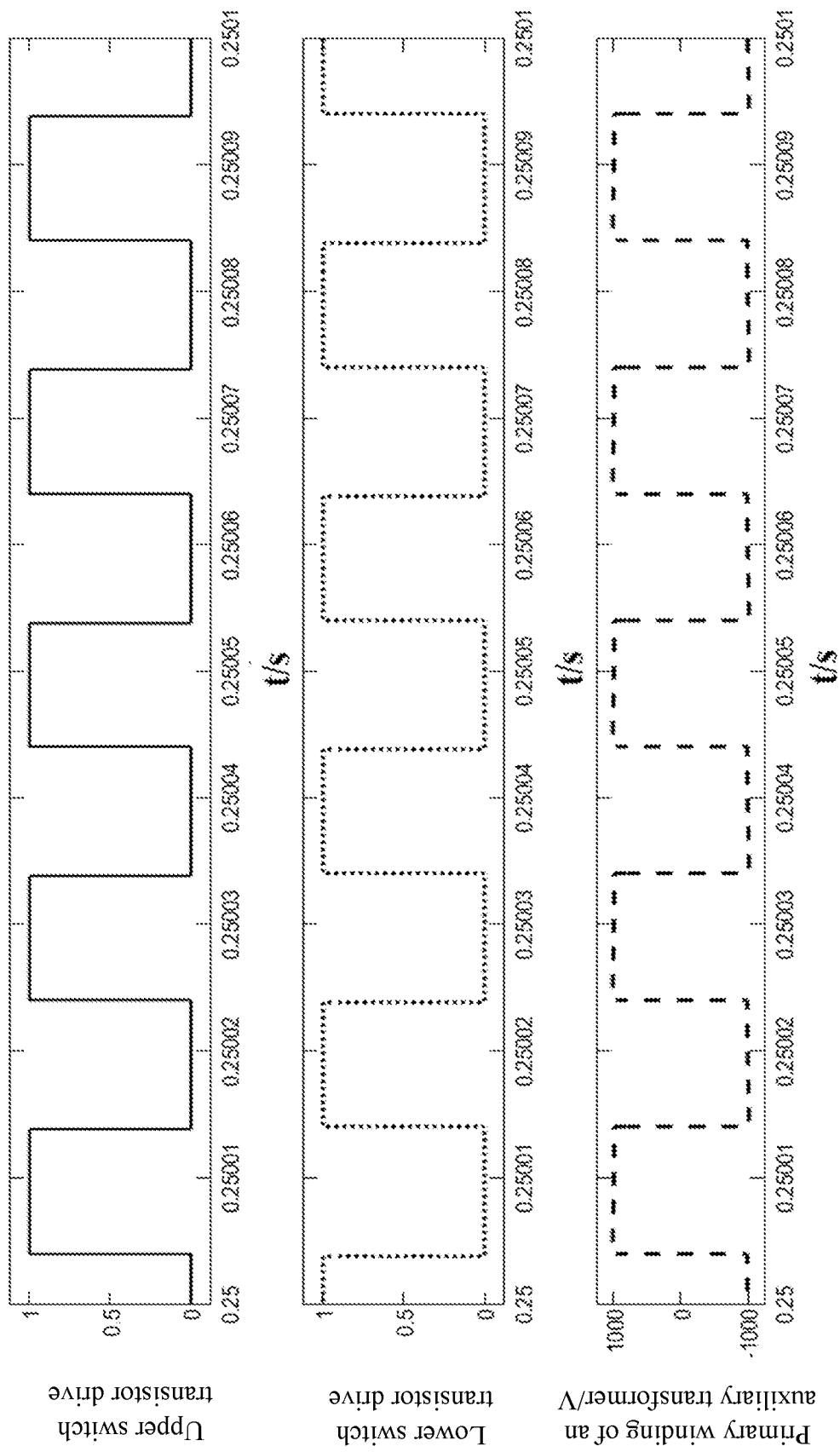
Figure 14C:
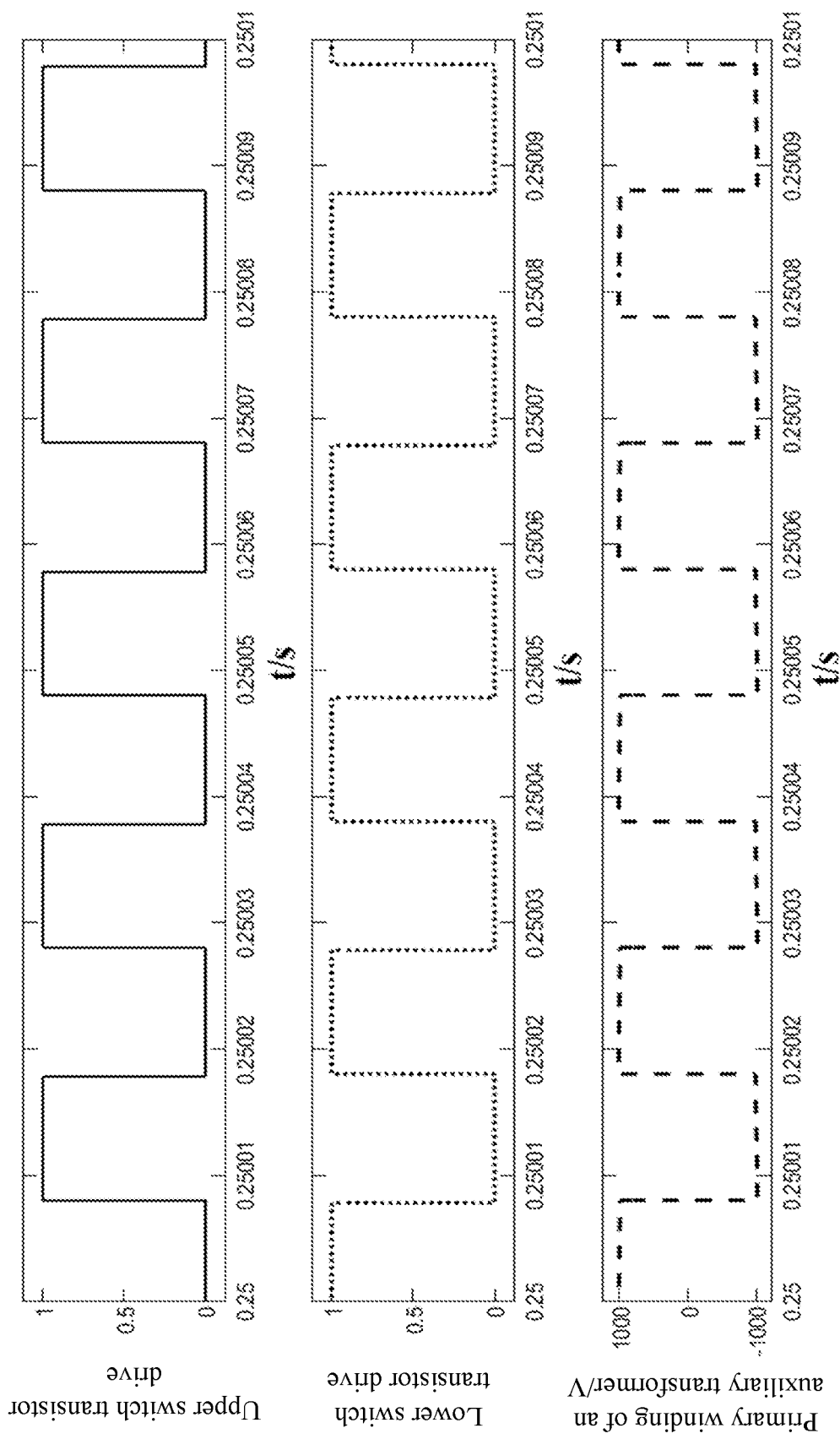
Figure 14D:
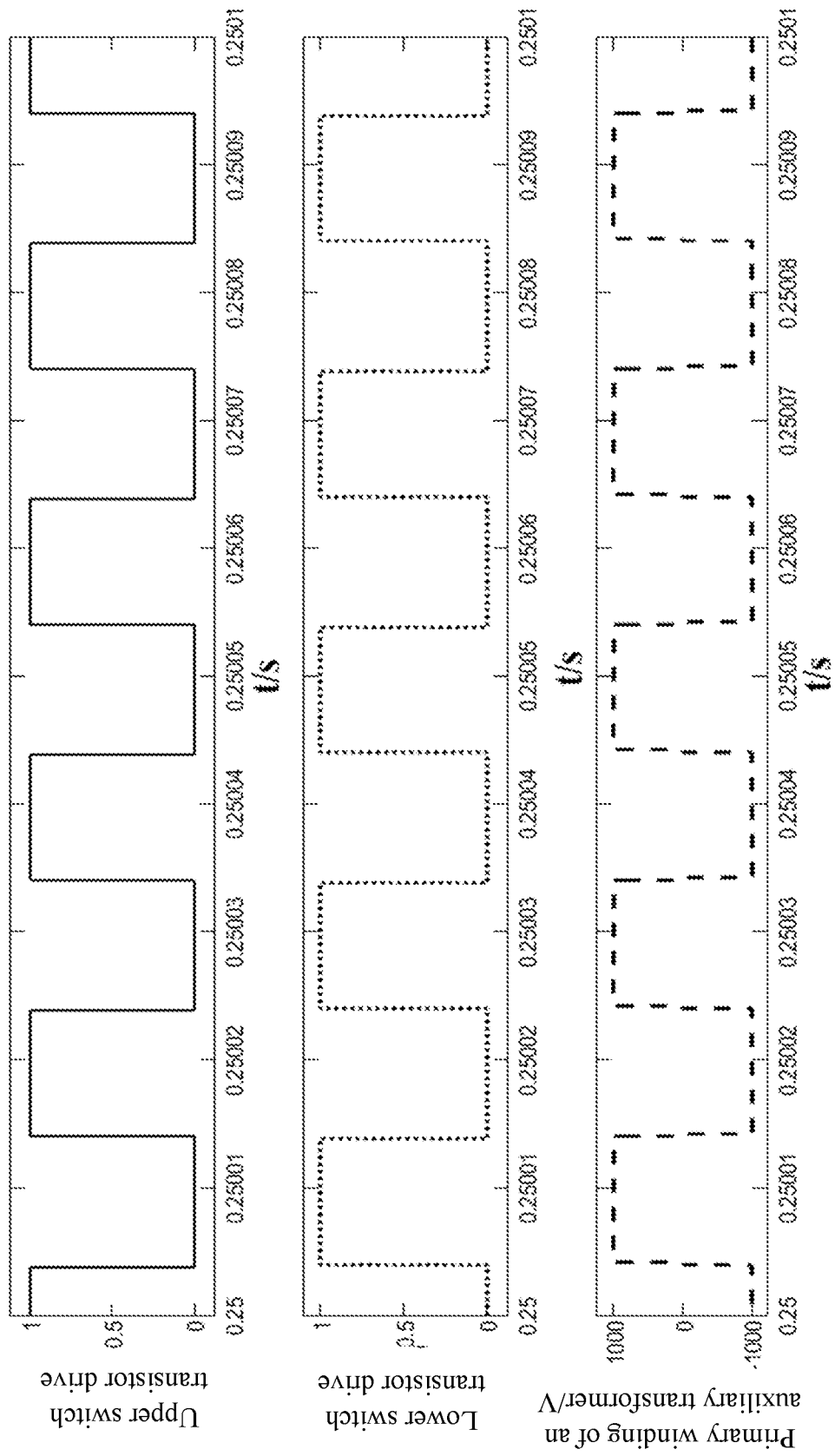

FIG. 12 is a schematic diagram of a process of a lower submodule supplying power to a primary winding of an auxiliary transformer.

Figure 15:
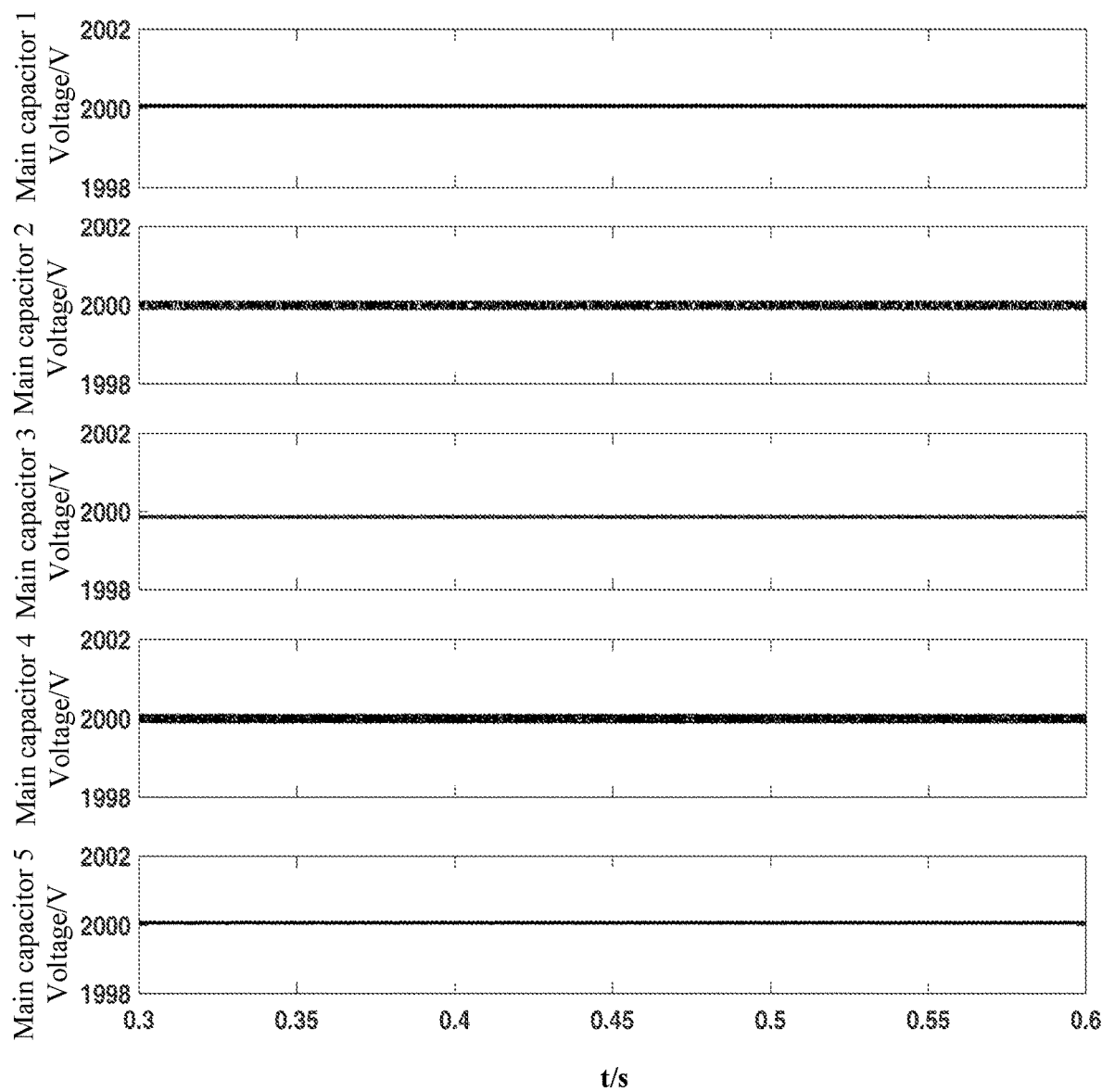
FIG. 15 is a voltage oscillogram of each main capacitor of the switched-capacitor type modular direct-current power supply with a high step-down ratio in FIG. 10 according to an embodiment of the present invention.

FIG. 15 shows voltage oscillograms of main capacitors of the switched-capacitor type modular direct-current power supply with a high step-down ratio in FIG. 10 according to an embodiment of the present invention. The upper main capacitor of the upper submodule 1 is a main capacitor 1. The lower main capacitor of the upper main capacitor 1 and the upper main capacitor of the upper submodule 2 are connected in series to form an upper main capacitor 2. The lower main capacitor of the upper submodule 2 and the upper main capacitor of the lower submodule 1 are connected in series to form a main capacitor 3. The lower main capacitor of the upper submodule 1 and the upper main capacitor of the lower submodule 2 are connected in series to form a main capacitor 4. The lower main capacitor of the lower submodule 2 is the main capacitor 5, and the terminal voltage of the main capacitor 3 is an output voltage. It can be seen from the waveform, the voltage of the main capacitor is shared well, which is consistent the expectation, achieving input voltage sharing.

Figure 16:
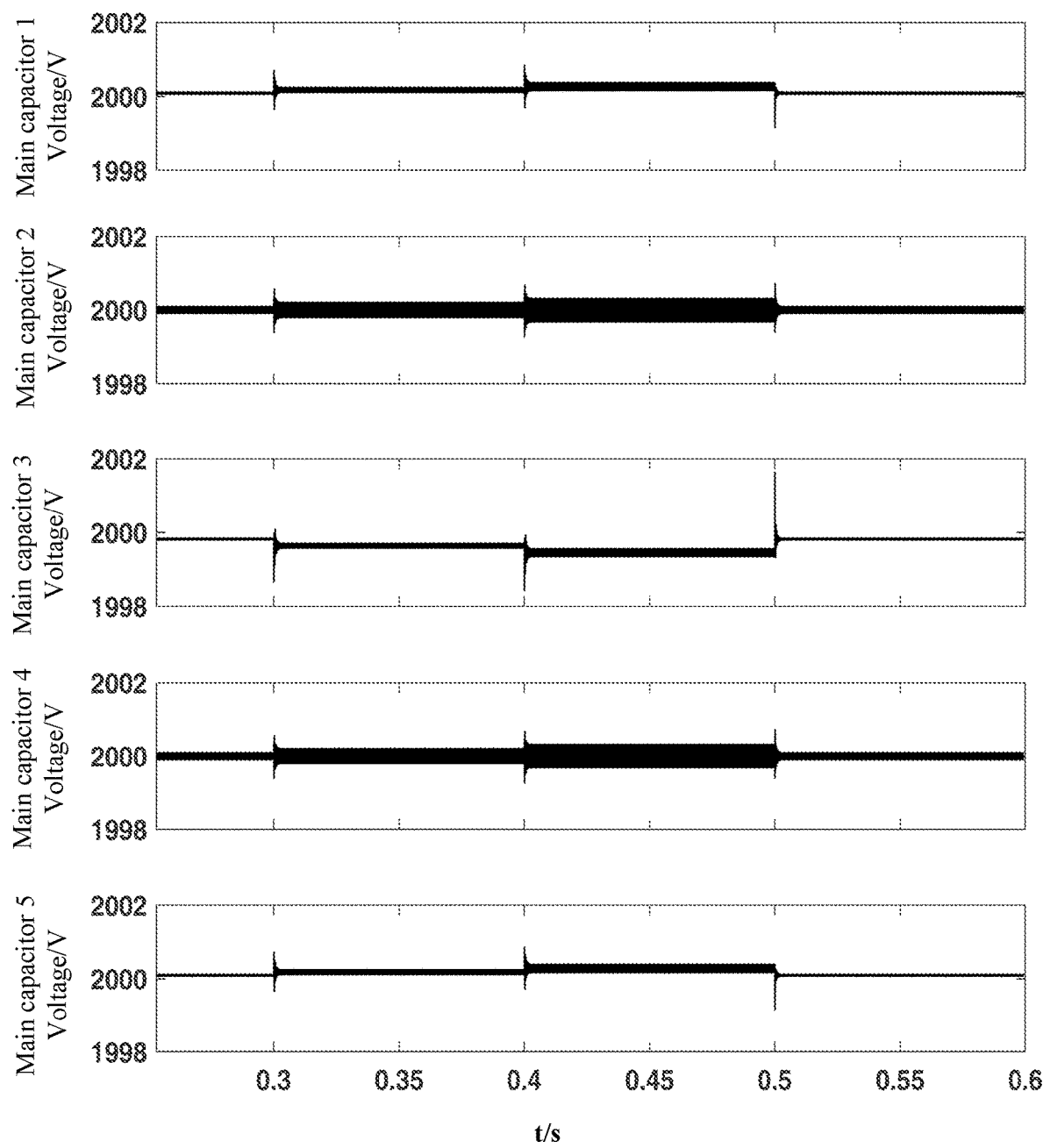
FIG. 16 is a voltage oscillogram of each main capacitor of an exemplary power supply for the switched-capacitor type modular direct-current power supply with a high step-down ratio in FIG. 10 during loading and unloading according to an embodiment of the present invention.
Figure 17A:
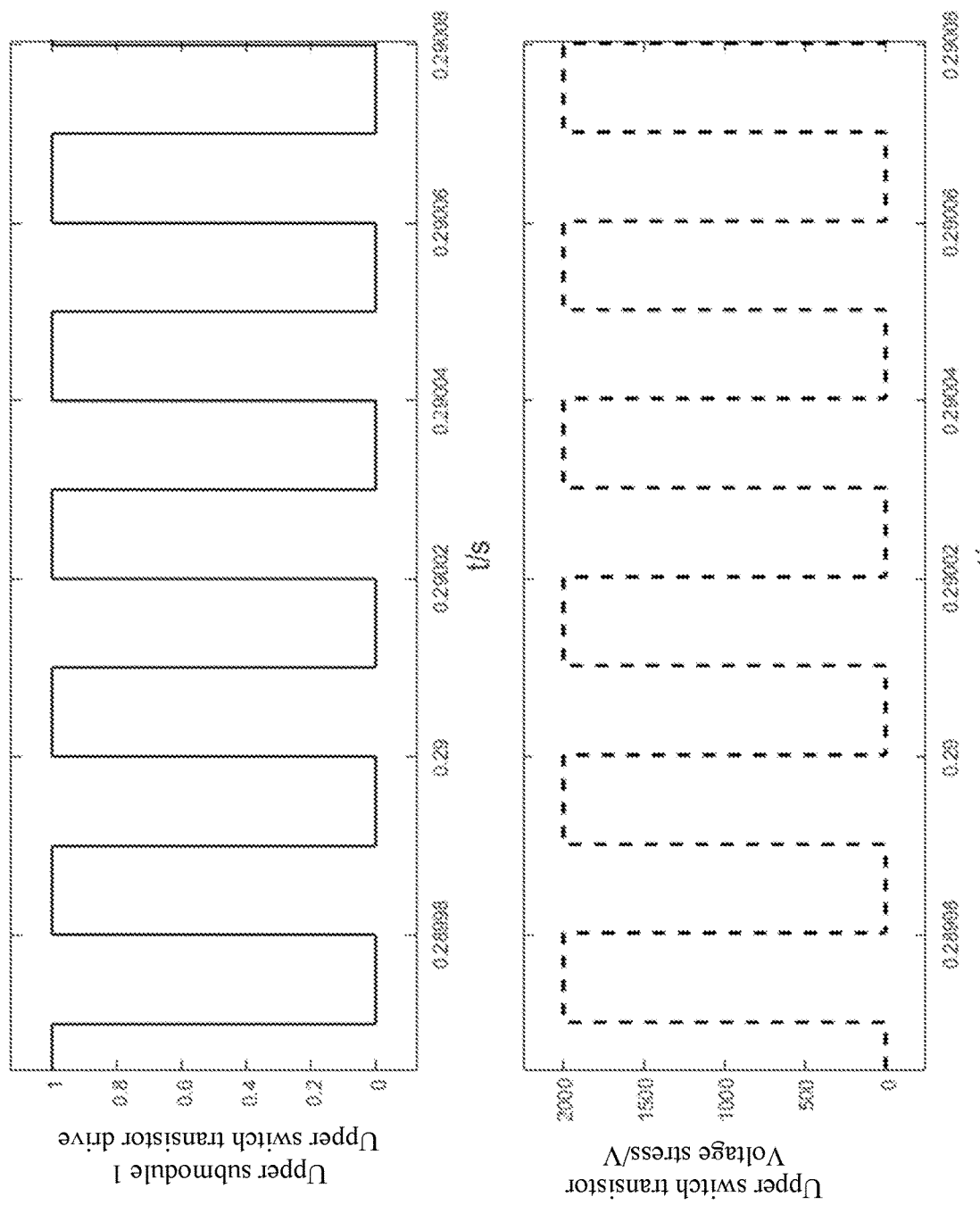
FIGS. 17 (a) to (d) are respectively voltage stress oscillograms of upper switch transistors in an upper submodule 1, an upper submodule 2, a lower submodule 1, and a submodule 2 of the switched-capacitor type modular direct-current power supply with a high step-down ratio in FIG. 10 according to an embodiment of the present invention.
Figure 17B:
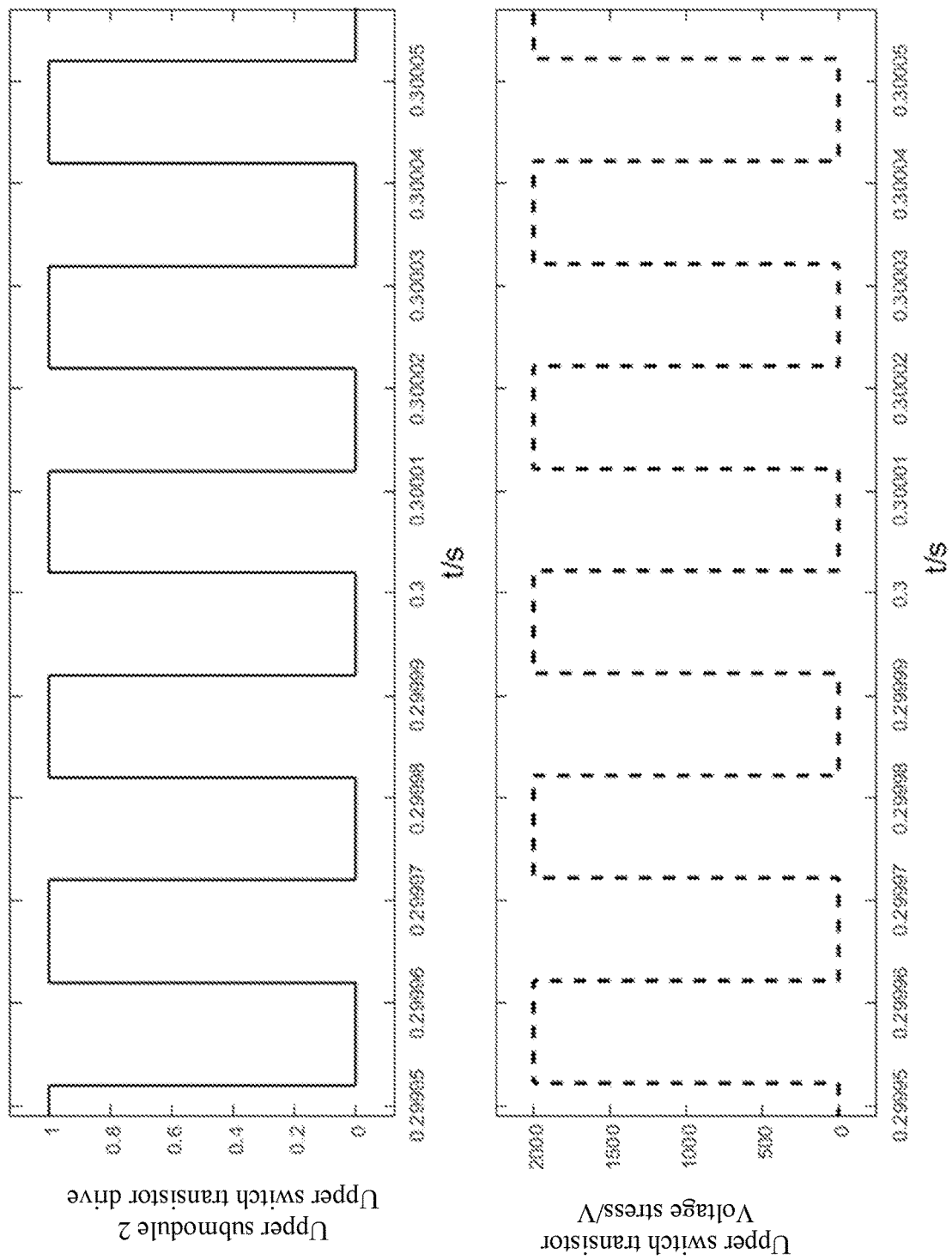
Figure 17C:
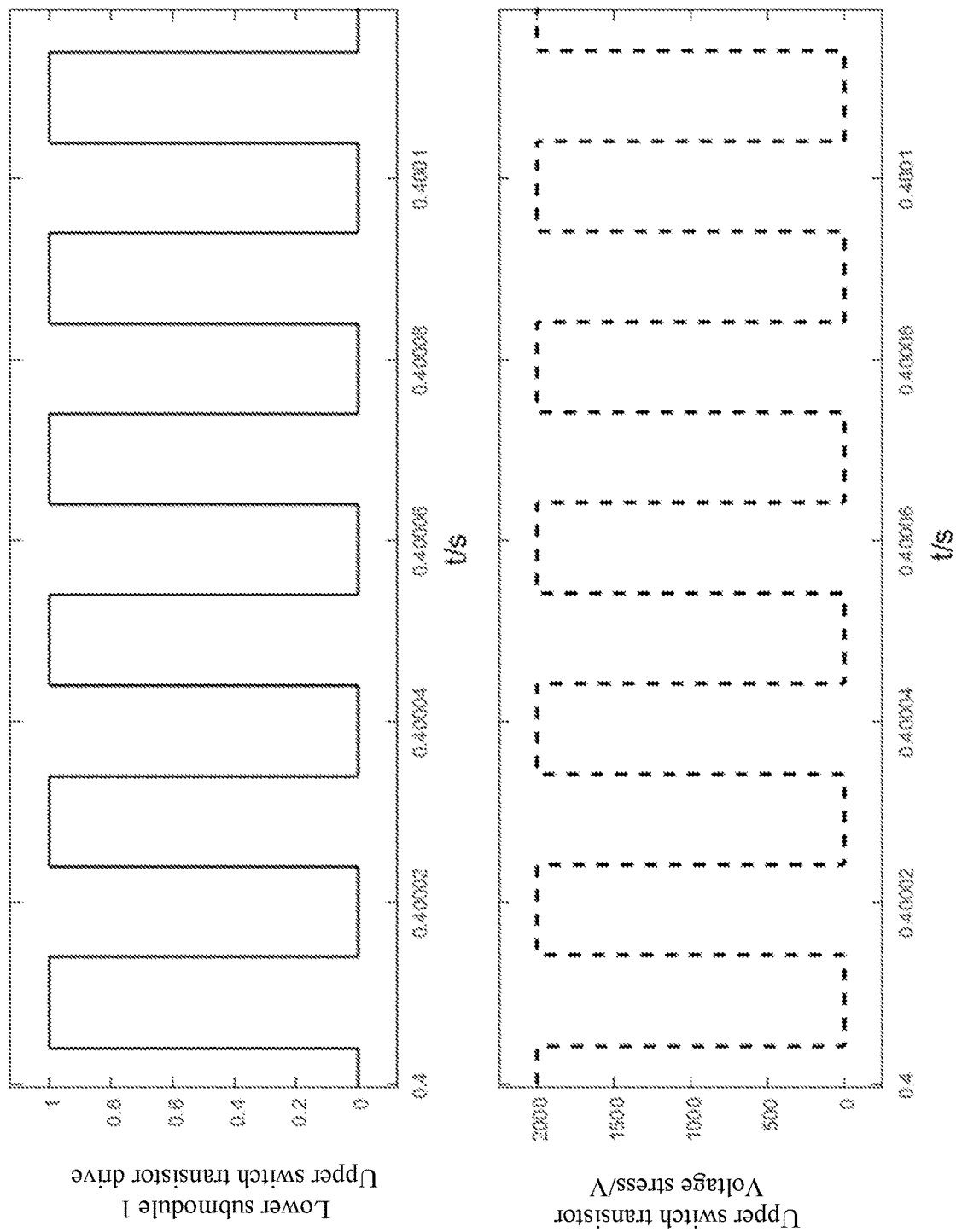
Figure 17D:
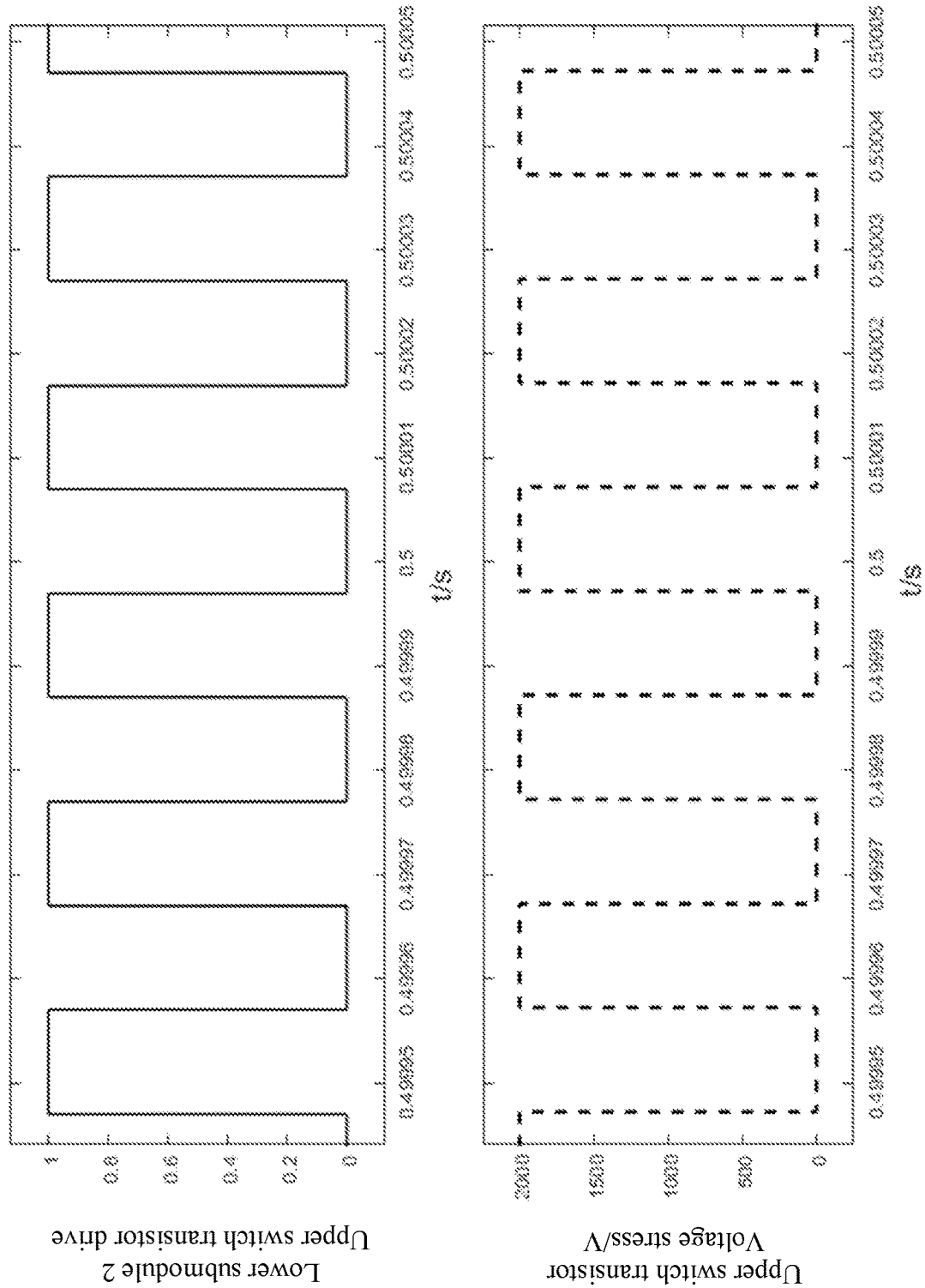

FIG. 16 is a voltage oscillogram of a main capacitor of an exemplary power supply for the switched-capacitor type modular direct-current power supply with a high step-down ratio in FIG. 10 during a load transient according to an embodiment of the present invention. The input voltage of the exemplary power supply is still 10 kV, with a load of 2 kΩ before loading. Before t=0.3 s, the power supply output has already reached a steady state. When t=0.3 s, the circuit suddenly loads, with the load changing to 1 kΩ and then maintained unchanged in the time interval t=[0.3 s, 0.4 s]. When t=0.4 s, the circuit suddenly loads again, with the load changing to 666.7Ω and maintained unchanged in the time interval t=[0.4 s, 0.5 s]. When t=0.5 s, the circuit suddenly unloads, with the load returning to 2 kΩ and then maintained unchanged in the time interval t=[0.5 s, 0.6 s]. In the whole process, the voltage of each series capacitor is maintained around 2000 V, with the largest deviation from an expected value controlled within ±0.43%.

FIGS. 17 (a) to (d) are respectively voltage stress oscillograms of switch transistors in an upper sub-module 1, an upper submodule 2, a lower submodule 1, and a lower submodule 2 of the switched-capacitor type modular direct-current power supply with a high step-down ratio in FIG. 10 according to an embodiment of the present invention. The testing conditions still includes a direct current voltage input of 10 kV and a load of 2 kΩ. Because amplitudes of the voltage stress waveforms of the upper and lower switch transistors in the module are almost identical, differing only in phase by 180°, only the voltage stress waveforms of the upper switch transistors in each module are provided. It can be seen that the maximum voltage stress withstood by the switch transistor in the module is the same as the terminal voltage of the main capacitor and only half of the module bus voltage, that is, 2 kV.

In summary, the switched-capacitor type modular direct-current power supply with a high step-down ratio in FIG. 10 according to an embodiment of the present invention can achieve voltage sharing between main capacitors of the power supply during asynchronous operations of switch transistors of the module. In addition, during the load transient, the voltage can be well shared between the main capacitors without the voltage or current measurement apparatus for feedback control. The submodules do not need to communicate with each other and can operate independently to enable normal operation of the system without the central controller. Thus, the solution of the present invention is easy to achieve with low costs. Based on the level of the input voltage, the number of the modules can be adjusted flexibly with good expansion. The voltage stress withstood by the switch transistor in the submodule is low, only half of the module bus voltage. Therefore, in a case of the same input voltage level, fewer modules can be used and the selection of switch transistor is simpler.

The foregoing examples specifically illustrate and describe exemplary implementation of the present invention. The foregoing embodiments are provided for merely explaining the technical solution of the present invention, such that persons of ordinary skill in the art understood and use the present invention. The present invention is not limited to the detailed structure, configuration method, or implementation described herein. It should be noted that those skilled in the art can easily make various modifications to the above embodiments, equivalently replace some or all technical features of the present invention, or apply the general principles described herein to other embodiments. Modifications or improvements made to the present invention, or equivalent substitutions to technical features that do not involve creative effort should be within the protection scope of the present invention.

The invention claimed is:

1. A switched-capacitor type modular direct-current power supply with a high step-down ratio, comprising: a load, an input source, an upper modular cascade circuit string formed by i upper submodule circuits and/or a lower modular cascade circuit string formed by j lower submodule circuits, wherein an upper submodule circuit comprises a first upper main capacitor, a first lower main capacitor, a first upper switch transistor, a first lower switch transistor, a first upper diode, a first lower diode, a first resonant inductor, a first upper resonant capacitor, a first lower resonant capacitor, a first auxiliary transformer, and three upper output ports, wherein a first upper output port, a positive electrode of the first upper main capacitor, and a drain of the first upper switch transistor are connected together, a second upper output port, a negative electrode of the first upper main capacitor, a positive electrode of the first lower main capacitor, a source of the first lower switch transistor, one end of a primary winding of the first auxiliary transformer, and a cathode of the first upper diode are connected together, a third upper output port, a negative electrode of the first lower main capacitor, and an anode of the first lower diode are connected together, a source of the first upper switch transistor, a drain of the first lower switch transistor, and a positive electrode of the first upper resonant capacitor are connected together, a negative electrode of the first upper resonant capacitor, one end of the first resonant inductor, and the other end of the primary winding of the first auxiliary transformer are connected together, an anode of the first upper diode, a cathode of the first lower diode, and a negative electrode of the first lower resonant capacitor are connected together, and the other end of the first resonant inductor is connected to a positive electrode of the first lower resonant capacitor; and the upper submodule circuit further comprises an independent first control module configured to control the on or off of the first upper switch transistor or the first lower switch transistor;

a lower submodule circuit comprises a second upper main capacitor, a second lower main capacitor, a second upper switch transistor, a second lower switch transistor, a second upper diode, a second lower diode, a second resonant inductor, a second upper resonant capacitor, a second lower resonant capacitor, a second auxiliary transformer, and three lower output ports, wherein a first lower output port, a positive electrode of the second upper main capacitor, and a cathode of the second upper diode are connected together, a second lower output port, a negative electrode of the second upper main capacitor, a positive electrode of the second lower main capacitor, an anode of the second lower diode, one end of a primary winding of the second auxiliary transformer, and a drain of the second upper switch transistor are connected together, a third lower output port, a negative electrode of the second lower main capacitor, and a source of the second lower switch transistor are connected together, an anode of the second upper diode, a cathode of the second lower diode, and a positive electrode of the second upper resonant capacitor are connected together, a source of the second upper switch transistor, a drain of the second lower switch transistor, and a negative electrode of the second lower resonant capacitor are connected together, a negative electrode of the second upper resonant capacitor is connected to one end of the second resonant inductor, the other end of the primary winding of the second auxiliary transformer, the other end of the second resonant inductor, and a positive electrode of the second lower resonant capacitor are connected together; and the lower submodule circuit further comprises an independent second control module configured to control the on or off of the second upper switch transistor or the second lower switch transistor; the upper modular cascade circuit string comprises three upper ports and the i upper submodule circuits, wherein a first upper port is connected to a first upper output port of a first upper submodule circuit, a second upper port is connected to a third upper output port of an i-th upper submodule circuit, and a third upper port is connected to a second upper output port of the i-th upper submodule circuit; and the i upper submodule circuits within the string are connected in the following manner: a second upper output port of a preceding upper submodule circuit is connected to a first upper output port of an adjacently subsequent upper submodule circuit, and a third upper output port of the preceding upper submodule circuit is connected to a second upper output port of the adjacently subsequent upper submodule circuit, i being a natural number; and the lower modular cascade circuit string comprises three lower ports and the j lower submodule circuits, wherein a first lower port is connected to a first lower output port of a first lower submodule circuit, a second lower port is connected to a second lower output port of the first lower submodule circuit, and a third lower port is connected to a third lower output port of a j-th lower submodule circuit; and the j lower submodule circuits within the string are connected in the following manner: a second lower output port of a preceding lower submodule circuit is connected to a first lower output port of an adjacently subsequent lower submodule circuit, and a third lower output port of the preceding lower submodule circuit is connected to a second lower output port of the adjacently subsequent lower submodule circuit, j being a natural number; wherein when the switched-capacitor type modular direct-current power supply with a high step-down ratio comprises both the upper modular cascade circuit string and the lower modular cascade circuit string, wherein $2<i$ and $2<j$, the modular cascade circuit strings are connected to the input source and the load in the following manner: the first upper port of the upper modular cascade circuit string is connected to a positive electrode of the input source, the third lower port of the lower modular cascade circuit string is connected to a negative electrode of the input source, the third upper port of the upper modular cascade circuit string, the first lower port of the lower modular cascade circuit string, and a positive electrode of the load are connected together, and the second upper port of the upper modular cascade circuit string, the second lower port of the lower modular cascade circuit string, and a negative electrode of the load are connected together; when the switched-capacitor type modular direct-current power supply with a high step-down ratio comprises the upper modular cascade circuit string, wherein $2<i$ and $j=0$, the modular cascade circuit string is connected to the input source and the load in the following manner: the first upper port of the upper modular cascade circuit string is connected to the positive electrode of the input source, the third upper port of the upper modular cascade circuit string is connected to the positive electrode of the load, and the second upper port of the upper modular cascade circuit string, the negative electrode of the load, and the negative electrode of the input source are connected together; and when the switched-capacitor type modular direct-current power supply with a high step-down ratio comprises the lower modular cascade circuit string, wherein $i=0$ and $2<j$, the modular cascade circuit string is connected to the input source and the load in the following manner: the first lower port of the lower modular cascade circuit string, the positive electrode of the load, and the positive electrode of the input source are connected together, the second lower port of the lower modular cascade circuit string is connected to the negative electrode of the load, and the third lower port of the lower modular cascade circuit string is connected to the negative electrode of the input source.

2. The switched-capacitor type modular direct-current power supply with a high step-down ratio according to claim 1, wherein each of the upper submodule circuits supplies power to the first control module of the upper submodule circuit via the first auxiliary transformer.

3. The switched-capacitor type modular direct-current power supply with a high step-down ratio according to claim 1, wherein each of the lower submodule circuits supplies power to the second control module of the lower submodule circuit via the second auxiliary transformer.

4. The switched-capacitor type modular direct-current power supply with a high step-down ratio according to claim 1, wherein $i=j$, $i\geq 2$, and $j\geq 2$.

5. The switched-capacitor type modular direct-current power supply with a high step-down ratio according to claim 1, wherein the first upper switch transistor, the second upper switch transistor, the first lower switch transistor, and the second lower switch transistor are fully-controlled power semiconductor devices.

6. The switched-capacitor type modular direct-current power supply with a high step-down ratio according to claim 1, wherein the first upper switch transistor, the second upper switch transistor, the first lower switch transistor, and the second lower switch transistor are semi-controlled power semiconductor devices.

7. The switched-capacitor type modular direct-current power supply with a high step-down ratio according to claim 1, wherein the first control module skips sampling a capacitor voltage or an inductor current of the upper submodule circuit, and the second control module skips sampling a capacitor voltage or an inductor current of the lower submodule circuit.

8. The switched-capacitor type modular direct-current power supply with a high step-down ratio according to claim 1, wherein the power supply needs no central controller.

* * * * *